US012583717B2

(12) United States Patent
Lee et al.

(10) Patent No.: US 12,583,717 B2
(45) Date of Patent: Mar. 24, 2026

(54) LIFT APPARATUS FOR VEHICLE

(71) Applicants: Hyundai Motor Company, Seoul (KR); Kia Corporation, Seoul (KR); PITIN CO., LTD, Uiwang-si (KR)

(72) Inventors: Dae Won Lee, Gunpo-Si (KR); Hoon Min Jeon, Goyang-Si (KR); Se Kwon Kim, Incheon (KR); Hyun Woo Lim, Hwaseong-Si (KR)

(73) Assignees: Hyundai Motor Company, Seoul (KR); Kia Corporation, Seoul (KR); Pitin Co., Ltd., Uiwang-si (KR)

( * ) Notice: Subject to any disclaimer, the term of this patent is extended or adjusted under 35 U.S.C. 154(b) by 152 days.

(21) Appl. No.: 18/510,294

(22) Filed: Nov. 15, 2023

(65) Prior Publication Data

US 2024/0336460 A1 Oct. 10, 2024

(30) Foreign Application Priority Data

Apr. 7, 2023 (KR) ........................ 10-2023-0046309

(51) Int. Cl.
*B66F 7/28* (2006.01)
*B60S 5/06* (2019.01)

(52) U.S. Cl.
CPC .. *B66F 7/28* (2013.01); *B60S 5/06* (2013.01)

(58) Field of Classification Search
CPC ....................................................... B66F 7/28
See application file for complete search history.

(56) References Cited

FOREIGN PATENT DOCUMENTS

| | | | | | |
|---|---|---|---|---|---|
| CN | 207811165 | U | | 9/2018 | |
| CN | 212861165 | U | | 4/2021 | |
| CN | 214112336 | U | * | 9/2021 | |
| CN | 215361026 | U | * | 12/2021 | |
| CN | 115285878 | A | | 11/2022 | |
| CN | 115285879 | A | | 11/2022 | |
| CN | 115448216 | A | * | 12/2022 | ............... B66F 7/02 |
| CN | 115848321 | A | * | 3/2023 | |
| CN | 116163567 | A | * | 5/2023 | ............... B60S 5/06 |
| CN | 109532778 | B | * | 4/2025 | ............. B66F 53/80 |
| EP | 3705363 | A1 | * | 9/2020 | ............. B60L 53/80 |
| KR | 10-0726177 | B | | 6/2007 | |
| KR | 10-2361590 | B | | 2/2022 | |
| KR | 10-2449493 | B | | 9/2022 | |
| WO | WO-2025035738 | A1 | * | 2/2025 | ............. B60L 53/80 |

OTHER PUBLICATIONS

Machine Translation of CN 115848321.*

* cited by examiner

*Primary Examiner* — Diem M Tran
(74) *Attorney, Agent, or Firm* — MORGAN, LEWIS & BOCKIUS LLP

(57) ABSTRACT

A lift apparatus for a vehicle includes a frame that provides an entry space that the vehicle required to be lifted enters and a lifting and lowering module that raises and lowers the vehicle in the entry space relative to the frame. The lifting and lowering module includes a wheel support portion that supports a wheel of the vehicle and a pusher that presses the wheel supported on the wheel support portion so that a lateral center portion of the entry space and a lateral center portion of the vehicle are aligned with each other.

16 Claims, 18 Drawing Sheets

A-A'

B-B'

LIFT APPARATUS FOR VEHICLE

CROSS-REFERENCE TO RELATED APPLICATION

The present application claims priority to Korean Patent Application No. 10-2023-0046309, filed on Apr. 7, 2023, the entire contents of which is incorporated herein for all purposes by this reference.

BACKGROUND OF THE PRESENT DISCLOSURE

Field of the Present Disclosure

The present disclosure relates to a lift apparatus for a vehicle.

Description of Related Art

In recent years, with the increase in demand and supply for electric vehicles, interest in batteries that account for most of the prices of the electric vehicles is rising. The batteries are mainly implemented with high-voltage batteries. The high-voltage batteries are sensitive to surroundings. The high-voltage batteries are driven in harsh environments as the high-voltage batteries supply energy required for acceleration and deceleration of the electric vehicles. When the batteries are defective, it takes a lot of time to repair the batteries. As the battery repair time increases, drivers may not be able to drive the electric vehicles during the battery repair time.

To solve the problem that the drivers' driving are restricted due to the time required for repairing the batteries, studies regarding a battery swapping system that replaces an existing battery provided in an electric vehicle with a new battery have been increasingly conducted.

The battery swapping system includes a lift apparatus that raises the electric vehicle and a battery transfer apparatus that transfers a battery to a place below a vehicle body of the electric vehicle raised by the lift apparatus. The lift apparatus refers to an apparatus capable of raising the vehicle while supporting wheels of the vehicle.

The lift apparatus is configured to raise the vehicle in a state in which the wheels of the vehicle entering in an entry space are supported on a wheel support part included in the lift apparatus. Meanwhile, the wheels supported on the wheel support part may be placed in a misaligned state in which the wheels are misaligned with respect to the wheel support part due to vibration generated in the vehicle while the vehicle enters the entry space, or unsophisticated steering.

The lift apparatus in the related art is configured to immediately raise the vehicle in the state in which the wheels of the vehicle are supported on the wheel support part. Meanwhile, in a case in which the lift apparatus raises the vehicle when the wheels supported on the wheel support part are in the misaligned state, the battery transferred by the battery transfer apparatus and a lower portion of the vehicle may not be aligned with each other when a battery provided in the lower portion of the vehicle is replaced through the battery transfer apparatus.

When battery swapping is performed in the state in which the battery and the lower portion of the vehicle are not aligned with each other as described above, the battery and the vehicle body may be damaged.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a lift apparatus configured for aligning wheels of a vehicle with respect to the lift apparatus by pressing the wheels of the vehicle placed in a misaligned state.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lift apparatus for a vehicle includes a frame that provides an entry space that the vehicle required to be lifted enters and a lifting and lowering module that raises and lowers the vehicle in the entry space relative to the frame. The lifting and lowering module includes a wheel support portion that supports a wheel of the vehicle and a pusher that presses the wheel supported on the wheel support portion so that a lateral center portion of the entry space and a lateral center portion of the vehicle are aligned with each other.

The wheel support portion may include a roller portion including a roller that rotates about a roller rotation axis extending in a direction perpendicular to a width direction of the entry space so that the wheel is moved in the width direction of the entry space when the pusher presses the wheel.

The roller portion, viewed in the width direction of the entry space, may include a shape in which a width thereof in a forward and backward direction is decreased downward.

The roller portion may include a first rolling region including a first roller that forms a front side of the roller portion and a second rolling region including a second roller that forms a rear side of the roller portion. The first rolling region may obliquely extend in the forward and backward direction so that a front end portion thereof is disposed above a rear end portion thereof, and the second rolling region may obliquely extend in the forward and backward direction so that a rear end portion thereof is disposed above a front end portion thereof.

The lifting and lowering module may include a first lifting and lowering module, a position of which is fixed relative to the frame in a forward and backward direction and a second lifting and lowering module that moves relative to the frame in the forward and backward direction.

The lift apparatus may further include a length actuator that moves the second lifting and lowering module in the forward and backward direction and a lifting controller that is configured to control the length actuator so that a separation distance in the forward and backward direction between a center portion of the first lifting and lowering module and a center portion of the second lifting and lowering module corresponds to an input wheelbase, when the wheelbase of the vehicle scheduled to enter the entry space is input.

The first lifting and lowering module may raise and lower one of a front side wheel and a rear side wheel of the vehicle, and the second lifting and lowering module may raise and lower the other one of the front side wheel and the rear side wheel of the vehicle.

A first pusher being a pusher of the first lifting and lowering module and a second pusher being a pusher of the second lifting and lowering module may independently perform pressing operations.

The first lifting and lowering module may include a first roller portion that guides movement of a wheel pressed by the first pusher in a width direction of the entry space. The second lifting and lowering module may include a second roller portion that guides movement of a wheel pressed by the second pusher in the width direction of the entry space. A first length by which the first roller portion extends in the width direction of the entry space may be shorter than a second length by which the second roller portion extends in the width direction of the entry space.

A direction in which the pusher presses the wheel may be defined as a pressing direction, and a direction opposite to the pressing direction may be defined as an opposite pressing direction. Based on the width direction of the entry space, an end portion of the first roller portion in the pressing direction may be disposed in the opposite pressing direction when compared to an end portion of the second roller portion in the pressing direction. Based on the width direction of the entry space, an end portion of the first roller portion in the opposite pressing direction may correspond to an end portion of the second roller portion in the opposite pressing direction.

The lift apparatus may further include a lifting and lowering frame connected to the frame to be raised and lowered and a length guide disposed between the lifting and lowering frame and the second lifting and lowering module to guide movement of the second lifting and lowering module relative to the lifting and lowering frame in the forward and backward direction.

The pusher may include a contact block, at least a portion of which is brought into contact with the wheel of the vehicle when the pusher presses the wheel of the vehicle, and the contact block may extend in a forward and backward direction perpendicular to a width direction of the entry space.

The frame may include a front frame that forms a front side of the entry space and that includes a first front frame and a second front frame spaced from each other in a width direction of the entry space and a rear frame that forms a rear side of the entry space and that includes a first rear frame and a second rear frame spaced from each other in the width direction of the entry space. The lifting and lowering module may include a plurality of lifting and lowering modules that are raised and lowered relative to the first front frame, the second front frame, the first rear frame, and the second rear frame, respectively.

The lift apparatus may further include a wheel lifter that raises and lowers the lifting and lowering module relative to the frame. The wheel lifter may include a wheel lifting chain, one end portion of which is connected to the lifting and lowering module. The wheel lifting chain, viewed in a direction perpendicular to an up and down direction, may include a shape convex downward so that the one end portion and an opposite end portion of the wheel lifting chain are directed upwards.

The wheel lifting chain may be singly provided, and the wheel lifter may further include a single wheel lifting sprocket that raises and lowers the one end portion of the wheel lifting chain by rotating in a state of being engaged with a portion of the wheel lifting chain.

The lift apparatus may further include a wheel sensor configured for measuring a width of a wheel of a target vehicle to be lifted, the wheel of the target vehicle being supported on the wheel support portion, a pressing actuator that drives the pusher, and a lifting controller that compares an input width of the wheel of the target vehicle and a measurement result of the wheel sensor and is configured to control the pressing actuator.

The lifting and lowering module may include a (1-1)th lifting and lowering module that raises and lowers a (1-1)th wheel provided on one side of the target vehicle in a width direction and a (1-2)th lifting and lowering module that raises and lowers a (1-2)th wheel which is provided on an opposite side of the target vehicle in the width direction and that faces the (1-1)th wheel in the width direction. The lifting controller may be configured to determine a (1-1)th correction value corresponding to half of a difference between an input width of the (1-1)th wheel and a width of the (1-1)th wheel measured by the wheel sensor and a (1-2)th correction value corresponding to half of a difference between an input width of the (1-2)th wheel and a width of the (1-2)th wheel measured by the wheel sensor, may be configured for controlling the pressing actuator so that an end portion of a pusher of the (1-1)th lifting and lowering module is moved toward the (1-1)th wheel by the (1-1)th correction value to press the (1-1)th wheel and an end portion of a pusher of the (1-2)th lifting and lowering module is moved toward the (1-2)th wheel by the (1-2)th correction value to press the (1-2)th wheel, and may align the lateral center portion of the entry space and the lateral center portion of the vehicle with each other.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
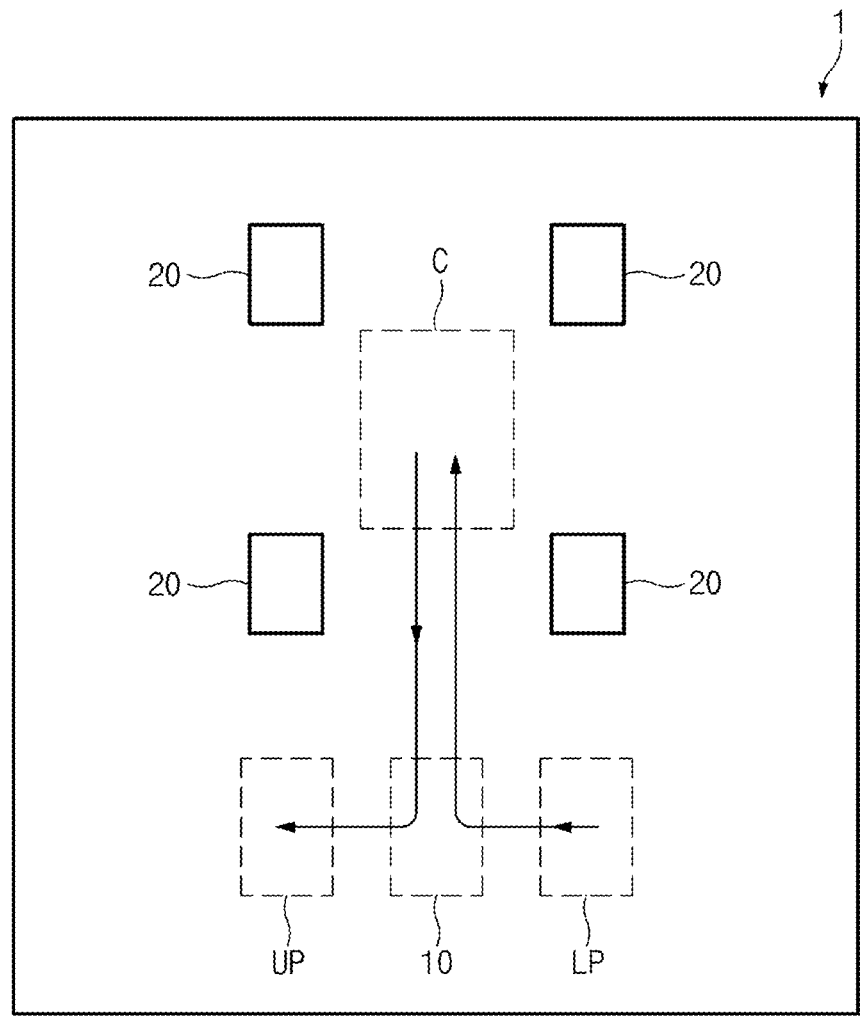
FIG. 1 is a schematic view exemplarily illustrating a battery swapping system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is predetermined by the identical numeral even when they are displayed on other drawings. Furthermore, in describing the exemplary embodiment of the present disclosure, a detailed description of well-known features or functions will be ruled out in order not to unnecessarily obscure the gist of the present disclosure.

In describing the components of the exemplary embodiment of the present disclosure, terms such as first, second, "A", "B", (a), (b), and the like may be used. These terms are merely intended to distinguish one component from another component, and the terms do not limit the nature, sequence or order of the components. When a component is referred to as "connected to", "seated on", "supported on", "accommodated in", "pressed to", "transferred to", or "inserted into" another component, this may mean that the component is directly "connected to", "seated on", "supported on", "accommodated in", "pressed to", "transferred to", or "inserted into" the other component or a third component is "connected", "seated", "supported", "accommodated", "pressed", "transferred", or "inserted" between the components.

Hereinafter, a battery swapping system 1 according to an exemplary embodiment of the present disclosure will be described with reference to the accompanying drawings.

Referring to FIG. 1, the battery swapping system 1 may replace a discharged battery provided in a vehicle C with a charged battery. For example, the battery swapping system 1 may remove the discharged battery provided in the vehicle C, may transfer the discharged battery to an unloading position UP, may transfer the charged battery from a loading position LP, and may equip the charged battery in the vehicle C. The battery swapping system 1 may include a battery transfer apparatus for battery swapping 10 (hereinafter, referred to as the "battery transfer apparatus"), a lift apparatus for a vehicle 20 (hereinafter, referred to as the "lift apparatus"), and a main controller.

Figure 2:
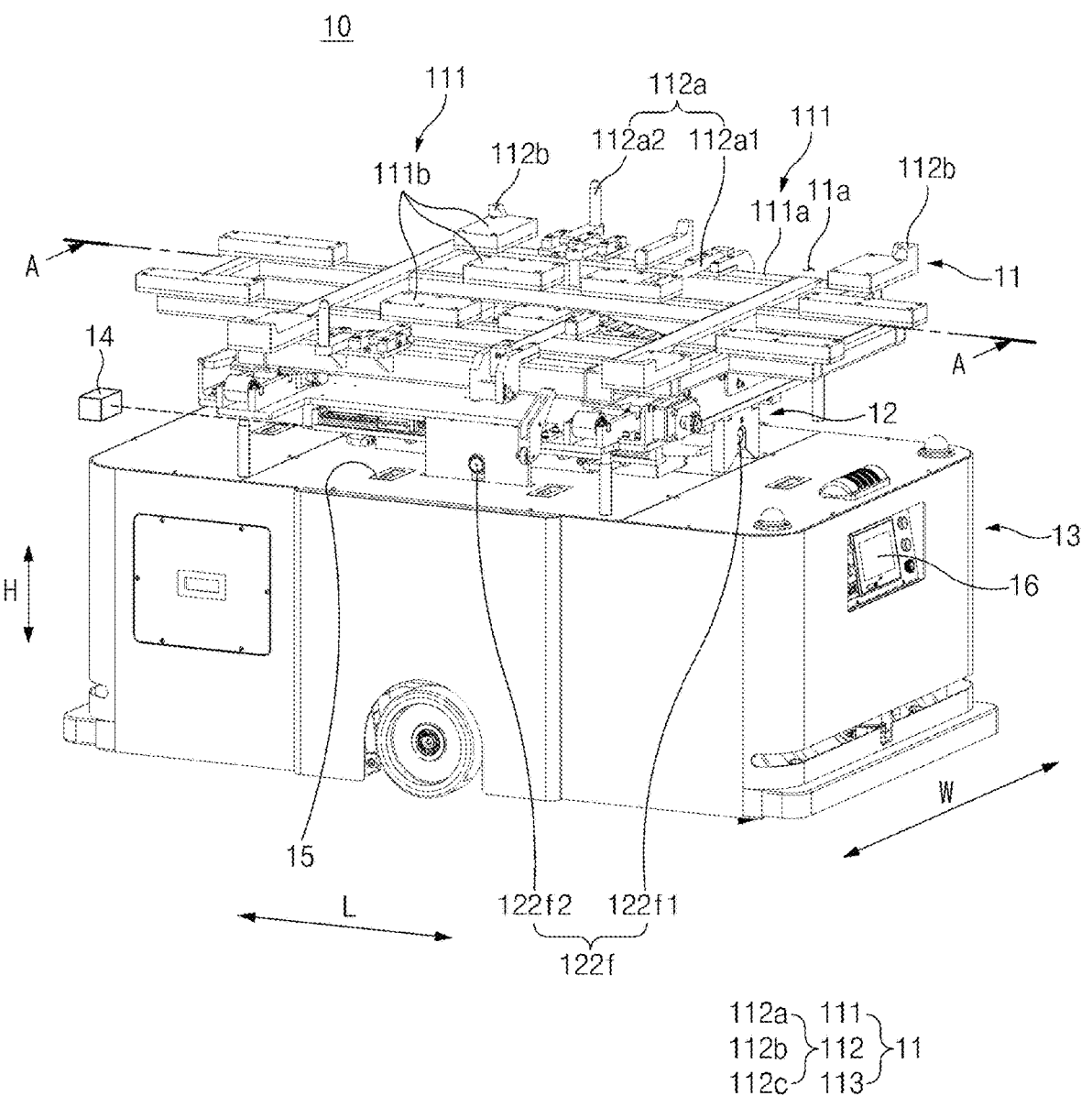
FIG. 2 is a perspective view of a battery transfer apparatus according to an exemplary embodiment of the present disclosure.
Figure 3:
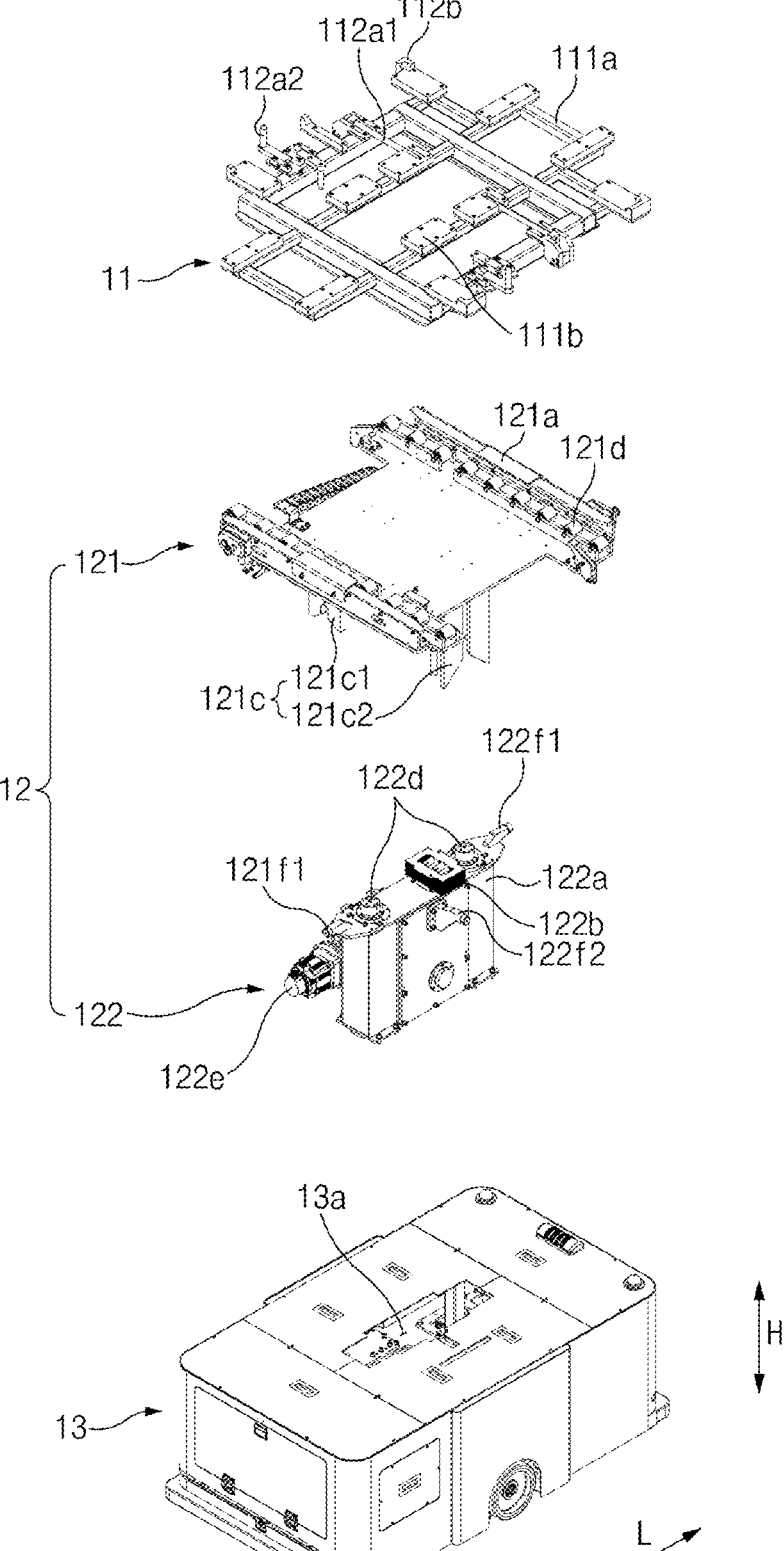
FIG. 3 is an exploded perspective view of the battery transfer apparatus according to an exemplary embodiment of the present disclosure.
Figure 4:
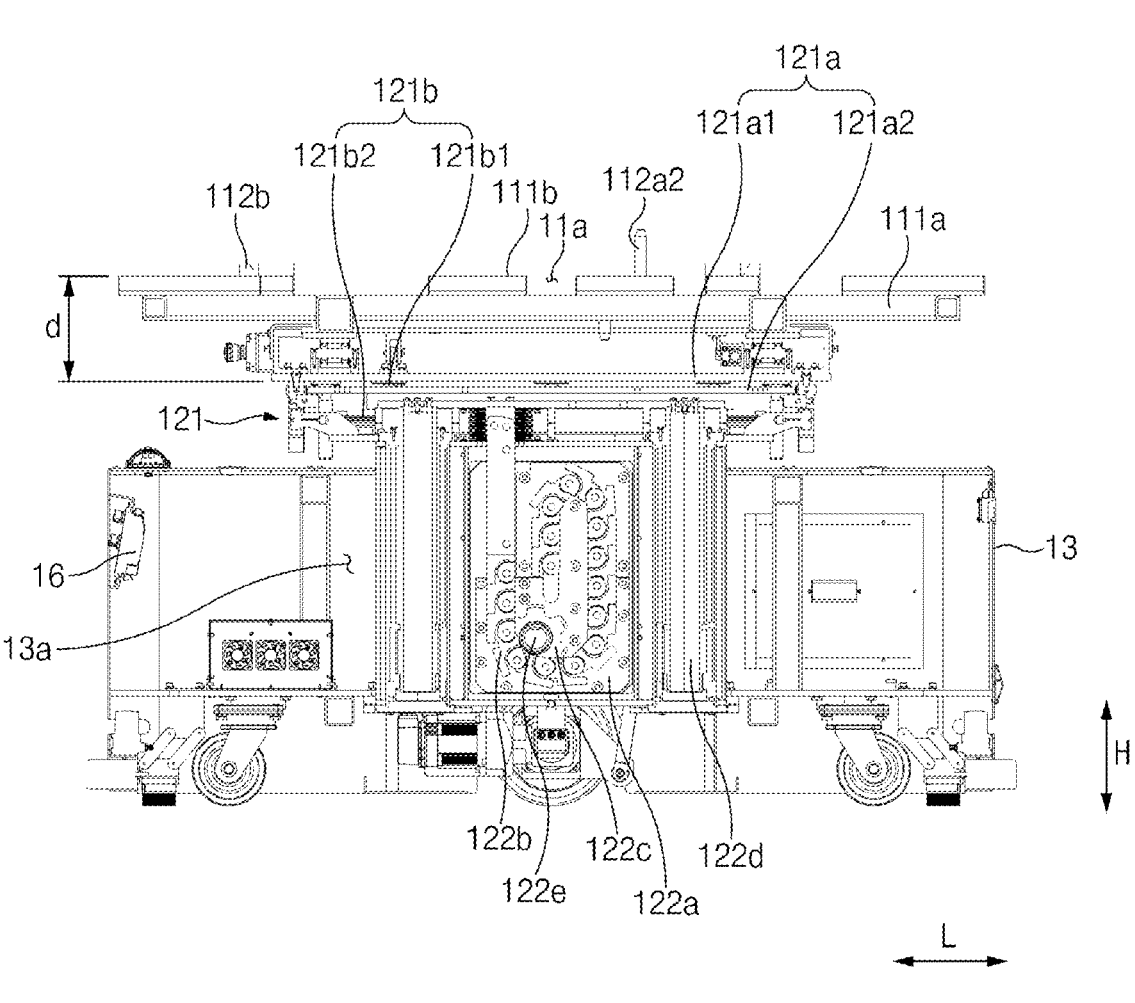
FIG. 4 is a longitudinal sectional view taken along line A-A' of FIG. 2.

Referring to FIG. 2, FIG. 3 and FIG. 4, the battery transfer apparatus 10 may transfer a battery to the vehicle C that requires battery swapping. For example, the battery transfer apparatus 10 may transfer the charged battery to a place below the vehicle C. The battery transfer apparatus 10 may be horizontally moved so that the battery approaches the place below the vehicle C lifted by the lift apparatus 20.

Furthermore, the battery transfer apparatus 10 may allow the battery approaching the place below the vehicle C to approach a battery receiving space of the vehicle C. For example, the battery transfer apparatus 10 may raise the battery approaching the place below the vehicle C toward the battery receiving space. The battery transfer apparatus 10 may include a seating portion 11, a position alignment portion 12, an unmanned transport vehicle 13, a driving device 14, a position sensor 15, and a transfer controller 16.

Figure 5:
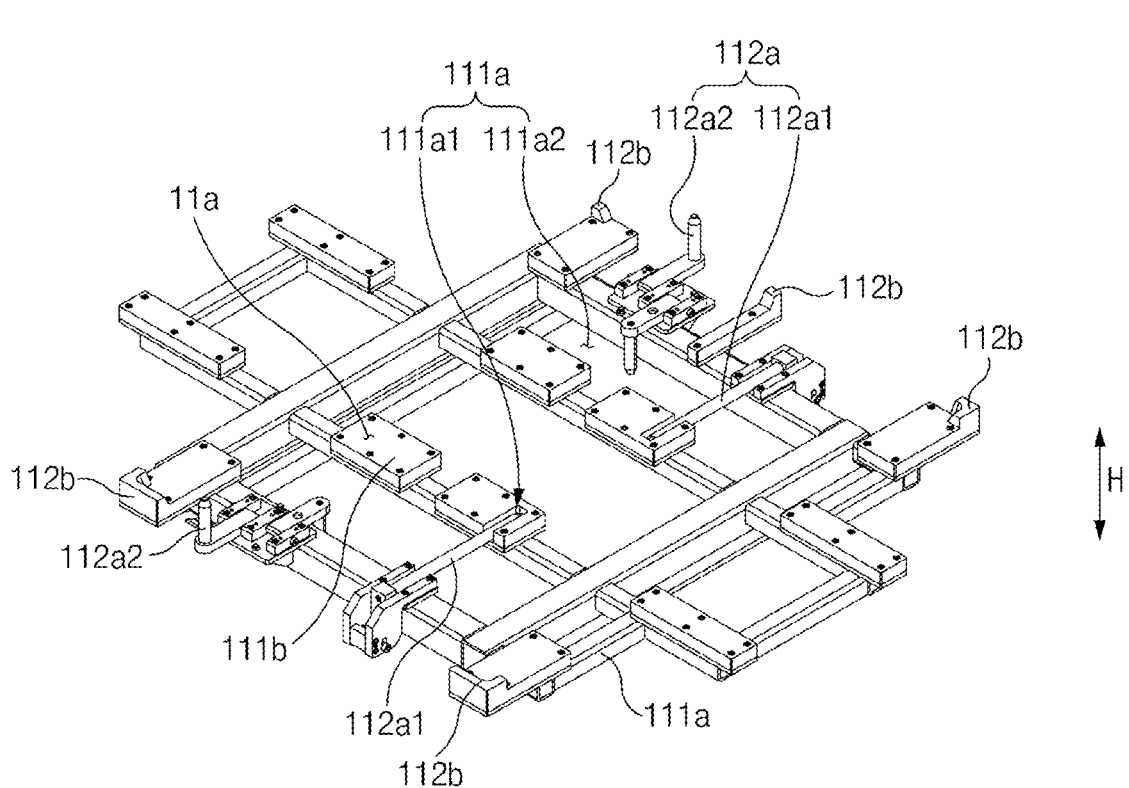
FIG. 5 is a perspective view of a seating portion according to an exemplary embodiment of the present disclosure.

Referring further to FIG. 5, the battery may be accommodated on the seating portion 11. For example, the seating portion 11 may provide a seating space 11*a* in which the battery is accommodated. The seating portion 11 may support the battery located in the seating space 11*a*. The seating portion 11 may include a seating frame 111 and a separation preventing portion 112.

The seating frame 111 may form an exterior of the seating portion 11. The seating frame 111 may have pin receiving holes 111*a*1 and 111*a*2 formed therein in which a position fixing pin 112*a* to be described below is accommodated. The pin receiving holes 111*a*1 and 111*a*2 may include the first pin receiving hole 111*a*1 and the second pin receiving hole 111*a*2. Furthermore, the seating frame 111 may include a frame body 111*a* and a base member 111*b*.

The frame body 111*a* may include a grid pattern shape. For example, the frame body 111*a* may include a longitudinal frame extending in a seating length direction L which is a longitudinal direction of the seating space 11*a* and a lateral frame extending in a seating width direction W which is a width direction of the seating space 11*a*. A plurality of longitudinal frames may be provided. The plurality of longitudinal frames may be spaced from each other in the width direction. A plurality of lateral frames may be provided. The plurality of lateral frames may be spaced from each other in the seating length direction L. The longitudinal frames and the lateral frames may be connected to cross each other. For example, the length by which the longitudinal frames extend may differ from the length by which the lateral frames extend. The first pin receiving hole 111a1 may be formed in the frame body 111a.

The first pin receiving hole 111a1 may be formed through the frame body 111a in an up and down direction H. For example, the vertical separation distance between an upper end portion and a lower end portion of the first pin receiving hole 111a1 may be equal to the vertical separation distance between an upper end portion and a lower end portion of the frame body 111a.

An upper surface of the base member 111b may be brought into close contact with a lower surface of the battery accommodated in the seating space 11a. The base member 111b may be disposed on an upper side of the frame body 111a. A plurality of base members 111b may be provided. The plurality of base members 111b may be spaced from each other along the longitudinal frames and the lateral frames. In other words, the plurality of base members 111b may be spaced from each other in the seating width direction W and the seating length direction L. Furthermore, the second pin receiving hole 111a2 may be formed in the base member 111b.

The second pin receiving hole 111a2 may horizontally extend on an upper portion of the base member 111b. For example, the second pin receiving hole 111a2 may be a groove extending in the seating width direction W.

The separation preventing portion 112 may prevent the battery accommodated in the seating space 11a from being separated from the seating space 11a in a horizontal direction. In other words, the separation preventing portion 112 may allow the battery accommodated in the seating space 11a to be separated upwards from the seating space 11a. The separation preventing portion 112 may include the position fixing pin 112a and a close contact portion 112b.

The position fixing pin 112a may fix the horizontal position of the battery, which is accommodated in the seating space 11a, with respect to the seating space 11a. The position fixing pin 112a may be inserted into a battery hole formed in the battery and a vehicle hole formed in the vehicle. The battery hole may be a hole formed at the periphery of the battery. The vehicle hole may be a hole formed in a region located at the periphery of the battery receiving space of the vehicle. When the position fixing pin 112a is inserted into the battery hole and the vehicle hole, the battery hole may be located below the vehicle hole.

The position fixing pin 112a may be at least partially accommodated in the pin receiving holes 111a1 and 111a2. The position fixing pin 112a may be connected to the seating frame 111 to be rotatable. For example, the position fixing pin 112a may be hinged to the seating frame 111. The position fixing pin 112a may be rotatably connected to the seating frame 111 between a first state and a second state. For example, when the position fixing pin 112a is switched from the first state to the second state, the position fixing pin 112a may be rotated relative to the seating frame 111 in a direction away from the pin receiving holes 111a1 and 111a2.

The first state may refer to a state in which the position fixing pin 112a is accommodated in the pin receiving holes 111a1 and 111a2 and is not exposed above the seating frame 111. For example, the position fixing pin 112a placed in the first state may not be observed in a region located above the seating frame 111 when the seating portion 11 is viewed in a horizontal direction. In other words, when the position fixing pin 112a is placed in the first state, the position fixing pin 112a may not overlap the seating space 11a.

The second state may refer to a state in which the position fixing pin 112a is spaced from the pin receiving holes 111a1 and 111a2 to be directed upwards. For example, the position fixing pin 112a placed in the second state may be observed in a shape protruding upwards from the seating frame 111 when the seating portion 11 is viewed in a horizontal direction. In other words, when the position fixing pin 112a is placed in the second state, the position fixing pin 112a may at least partially overlap the seating space 11a.

The position fixing pin 112a may include a plurality of position fixing pins 112a. The plurality of position fixing pins 112a may fix the positions of different types of batteries, respectively. The plurality of position fixing pins 112a may be provided on the one seating portion 11. Because the positions of various types of batteries are fixed by the one seating portion 11, the battery transfer apparatus 10 according to an exemplary embodiment of the present disclosure has high versatility in that the battery transfer apparatus 10 is able to swap the various types of batteries.

The plurality of position fixing pins 112a may be disposed on one or more of opposite sides of the seating frame 111 in the width direction and opposite sides of the seating frame 111 in the longitudinal direction. For example, the plurality of position fixing pins 112a may be disposed on one side and an opposite side in the seating width direction W to be spaced from each other. In another example, the plurality of position fixing pins 112a may be disposed on one side and an opposite side in the seating length direction L to be spaced from each other.

The plurality of position fixing pins 112a may be connected to the seating frame 111 through a plurality of pin connecting portions. For example, the plurality of pin fixing pins 112a and the plurality of pin connecting portions may be fastened by hinges, respectively. The pin receiving hole 111a2 may be disposed between the plurality of pin connecting portions.

The plurality of position fixing pins 112a may include a first position fixing pin 112a1 and a second position fixing pin 112a2. However, the spirit and scope of the present disclosure is not limited thereto, and the plurality of position fixing pins 112a may further include one or more position fixing pins different from the first position fixing pin 112a1 and the second position fixing pin 112a2, in addition to the first position fixing pin 112a1 and the second position fixing pin 112a2.

The first position fixing pin 112a1 may be inserted into a battery hole of a first battery. Furthermore, the first position fixing pin 112a1 may be inserted into a vehicle hole formed in the vehicle in which the first battery is provided. The first position fixing pin 112a1 may extend by a first length.

The first position fixing pin 112a1, when placed in the first state, may be accommodated in the first pin receiving hole 111a1. Furthermore, the first position fixing pin 112a1, when placed in the first state, may be directed in the direction in which the first pin receiving hole 111a1 extends (e.g., a horizontal direction). For example, the first position fixing pin 112a1 may be directed in the seating width direction W when placed in the first state.

A plurality of first position fixing pins 112a1 may be provided. The plurality of first position fixing pins 112a1 may be disposed on the one side and the opposite side in the seating width direction W to be spaced from each other. The first pin receiving hole 111a1 may be disposed between a plurality of pin connecting portions fastened with the plurality of first position fixing pins 112a1 by hinges.

The pin connecting portions, which are fastened with the first position fixing pins 112*a*1 by the hinges, may have first inclined surfaces at external end portions thereof in the width direction. An outward direction in the width direction may refer in a direction in which the center portion of the seating frame 111 faces toward the position fixing pins 112*a*, and an inward direction in the width direction may refer in a direction opposite to the outward direction in the width direction. For example, in the width direction, upper end portions of the first inclined surfaces may be located inwardly of lower end portions of the first inclined surfaces.

The second position fixing pin 112*a*2 may be inserted into a battery hole of a second battery. The second battery may refer to a battery different from the first battery. The second position fixing pin 112*a*2 may be inserted into a vehicle hole formed in the vehicle in which the second battery is provided. The second position fixing pin 112*a*2 may extend by a second length. The first length and the second length may differ from each other. For example, the second length may be shorter than the first length.

Referring again to FIG. 4, the second position fixing pin 112*a*2, when place in the first state, may be directed downward. For example, when the second position fixing pin 112*a*2 is placed in the first state, a lower end portion of the second position fixing pin 112*a*2 may be spaced from an upper end portion of a center portion of the position alignment portion 12 in the up and down direction H. In more detail, a first separation distance d which is the separation distance between an upper end portion of the seating portion 11 and the upper end portion of the center portion of the position alignment portion 12 in the up and down direction H may be longer than the second length. Because the first separation distance d is longer than the second length, the second position fixing pin 112*a*2 and the position alignment portion 12 may not interfere with each other even though the second position fixing pin 112*a*2 is directed downward.

The first separation distance d may be shorter than the first length. Although the first separation distance d is shorter than the first length, interference between the first position fixing pin 112*a*1 and the position alignment portion 12 may be prevented as the first position fixing pin 112*a*1 placed in the first state is horizontally directed.

A plurality of second position fixing pins 112*a*2 may be provided. The plurality of second position fixing pins 112*a*2 may be disposed on the one side and the opposite side in the seating width direction W to be spaced from each other. The plurality of second position fixing pins 112*a*2 may be spaced from the plurality of first position fixing pins 112*a*1 in the seating length direction L.

The second pin receiving hole 111*a*2 may be disposed between a plurality of pin connecting portions fastened with the plurality of second position fixing pins 112*a*2 by hinges. A plurality of second pin receiving holes 111*a*2 may be provided to correspond to the plurality of second position fixing pins 112*a*2. The plurality of second pin receiving holes 111*a*2 may be spaced from each other in the width direction.

When the second position fixing pin 112*a*2 is in the first state and the first position fixing pin 112*a*1 is in the second state, the position fixing pins 112*a* may allow the first battery to be accommodated in the seating space 11*a*.

When the first position fixing pin 112*a*1 is in the first state and the second position fixing pin 112*a*2 is in the second state, the position fixing pins 112*a* may allow the second battery to be accommodated in the seating space 11*a*.

However, the spirit and scope of the present disclosure is not limited thereto, and when one of the different position fixing pins 112*a* is in the second state and the remaining position fixing pins are in the first state, the position fixing pins 112*a* may allow a battery corresponding to the one position fixing pin to be accommodated in the seating space 11*a*.

The close contact portion 112*b* may be brought into close contact with a battery circumferential surface which is a horizontal circumferential surface of a third battery accommodated in the seating space 11*a*. The third battery may refer to a battery different from the first battery and the second battery. A pin included in the vehicle (the vehicle in which the third battery is provided) may be inserted into a third battery hole which is a battery hole of the third battery brought into close contact with the close contact portion 112*b*. The battery transfer apparatus 10 according to an exemplary embodiment of the present disclosure has high versatility in that battery swapping is able to be performed, through the close contact portion 112*b*, on the vehicle in which the pin is included.

A plurality of close contact portions 112*b* may be provided. The plurality of close contact portions 112*b* may be spaced from each other along the battery circumference surface. For example, the plurality of close contact portions 112*b* may be spaced from each other in the seating width direction W and the seating length direction L.

One of the plurality of close contact portions 112*b* may include a shape protruding upwards from an upper surface of one of the plurality of base members 111*b*. For example, one close contact portion 112*b* may be provided on one base member 111*b*, and the plurality of base members 111*b* may include base members on which the plurality of close contact portions 112*b* are provided, respectively, and base members on which the plurality of close contact portions 112*b* are not provided.

When a fourth battery including a width greater than a first close-contact separation distance is accommodated on the seating portion 11, the fourth battery may be located above the plurality of close contact portions 112*b*. For example, a lower surface of the fourth battery may be brought into close contact with upper surfaces of at least some of the plurality of close contact portions 112*b*. The first close-contact separation distance may refer to the separation distance in the width direction between two close contact portions 112*b* spaced from each other in the seating width direction W among the plurality of close contact portions 112*b*.

When a fifth battery including a length greater than a second close-contact separation distance is accommodated on the seating portion 11, the fifth battery may be located above the plurality of close contact portions 112*b*. For example, a lower surface of the fifth battery may be brought into close contact with upper surfaces of at least some of the plurality of close contact portions 112*b*. The second close-contact separation distance may refer to the separation distance in the seating length direction L between two close contact portions 112*b* spaced from each other in the seating length direction L among the plurality of close contact portions 112*b*.

Figure 6:
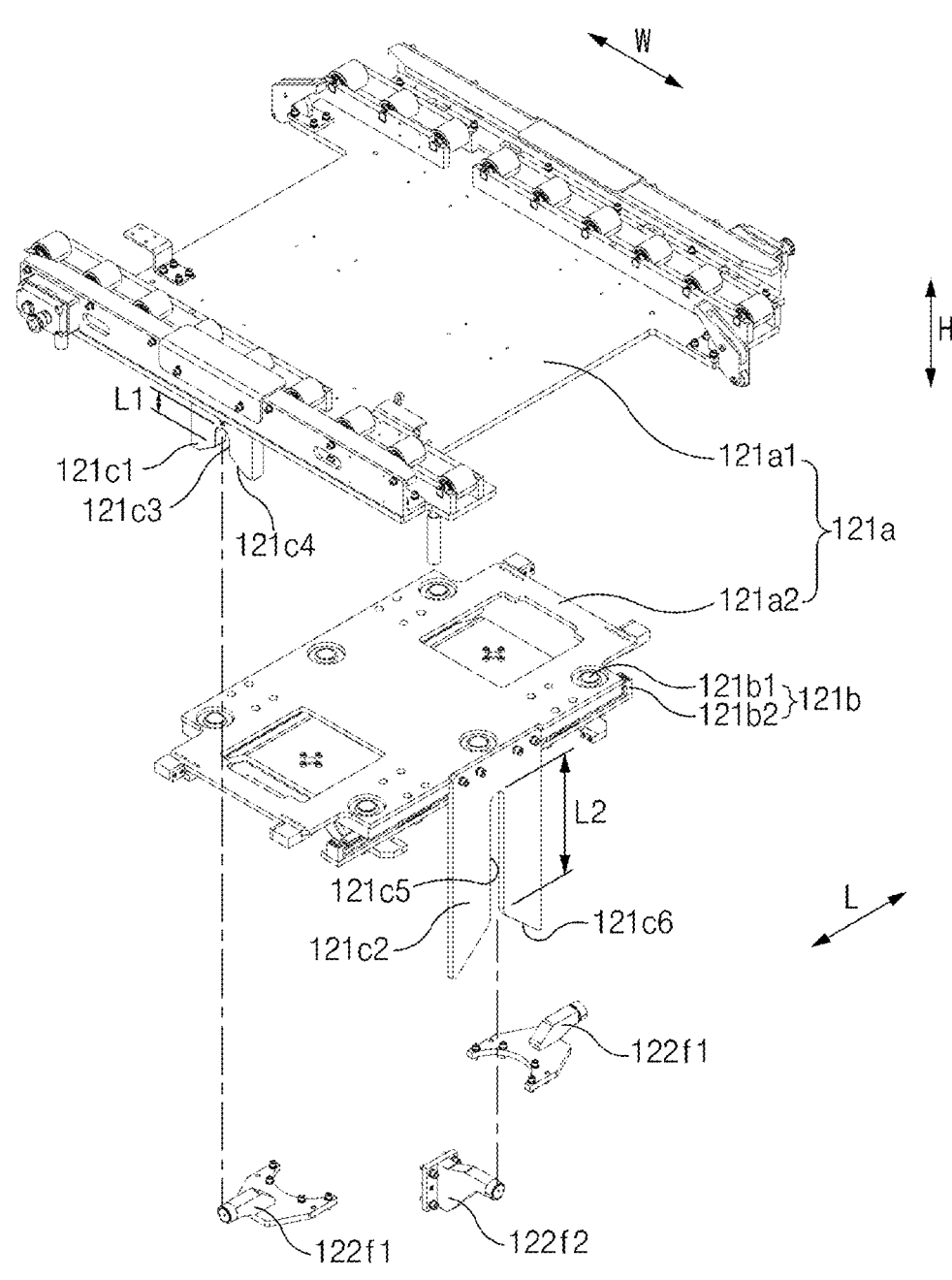
FIG. 6 is an exploded perspective view of a horizontal alignment portion and an engagement portion according to an exemplary embodiment of the present disclosure.

Referring further to FIG. 6, the position alignment portion 12 may allow the seating portion 11 to move relative to the battery receiving space so that the relative positions of the battery accommodated in the seating space 11*a* and the battery receiving space are aligned. When the seating portion 11 is allowed to move relative to the battery receiving space, this means that the seating portion 11 is able to be moved when an external force is applied to the seating portion 11. The application of the external force to the seating portion 11 may be construed as a concept that includes not only direct application of a force to the seating portion 11 by an operator but also application of a force to the seating portion 11 by a driving means (e.g., a motor, an actuator, or the like).

Hereinafter, the meaning of allowing movement of a component described in the present specification may be construed as a concept that includes not only direct application of a force to the component by an operator but also application of a force to the component by a driving means.

When the relative positions of the battery and the battery receiving space are aligned, this means that the positions of the battery and the battery receiving space relative to each other are aligned in the relationship between the battery and the battery receiving space, irrespective of the positions of the battery and the battery receiving space relative to other components.

The position alignment portion 12 may be disposed under the seating portion 11 and may support the seating portion 11. The position alignment portion 12 may include a horizontal alignment portion 121 and a lift 122.

The horizontal alignment portion 121 may allow the seating portion 11 to horizontally move relative to the lift 122 so that the relative horizontal positions of the battery accommodated in the seating space 11*a* and the battery receiving space are aligned. The horizontal alignment portion 121 may include a support plate 121*a*, a guide portion 121*b*, a bracket 121*c*, and a transfer roller portion 121*d*.

The support plate 121*a* may support the seating portion 11. The support plate 121*a* may be disposed between the seating portion 11 and the lift 122 based on the up and down direction H. The support plate 121*a* may include a first support plate 121*a*1 and a second support plate 121*a*2.

The first support plate 121*a*1 may be brought into close contact with at least a portion of a lower surface of the seating portion 11. For example, an upper portion of the first support plate 121*a*1 may be disposed to face the lower surface of the seating portion 11. Rotation and movement of the first support plate 121*a*1 relative to the second support plate 121*a*2 may be allowed.

For example, the first support plate 121*a*1 may be allowed to rotate relative to the second support plate 121*a*2 about a virtual rotation axis extending in the up and down direction H. Furthermore, the first support plate 121*a*1 may be allowed to move relative to the second support plate 121*a*2 in a first width direction. The first width direction may refer to the width direction of the second support plate 121*a*2.

When the rotation and movement of the first support plate 121*a*1 are allowed, the first support plate 121*a*1 may be rotated and/or moved relative to the second support plate 121*a*2 by an operator. However, without being limited thereto, the first support plate 121*a*1 may be rotated and/or moved relative to the second support plate 121*a*2 by a driving means (e.g., a motor, an actuator, or the like).

The second support plate 121*a*2 may support the first support plate 121*a*1. The second support plate 121*a*2 may be disposed under the first support plate 121*a*1. For example, the second support plate 121*a*2 may be disposed between the first support plate 121*a*1 and the lift 122 based on the up and down direction H.

The second support plate 121*a*2 may be allowed to move relative to the lift 122 in a first longitudinal direction. The first longitudinal direction may refer to the longitudinal direction of the second support plate 121*a*2. When the movement of the second support plate 121*a*2 is allowed, the second support plate 121*a*2 may be moved by the driving device 14.

When the second support plate 121*a*2 moves in the first longitudinal direction, the first support plate 121*a*1 and the seating portion 11 may move in the first longitudinal direction together with the second support plate 121*a*2. In more detail, when the second support plate 121*a*2 is moved to one side in the first longitudinal direction by a first distance and the first support plate 121*a*1 is moved to one side in the first width direction by a second distance and rotated by a predetermined angle in the clockwise direction (e.g., the clockwise direction based on when the upper side of the battery transfer apparatus 10 is viewed), the seating portion 11 may be moved to the one side in the first longitudinal direction by the first distance relative to the battery receiving space, may be moved to the one side in the first width direction by the second distance relative to the battery receiving space, and may be rotated in the clockwise direction by the predetermined angle relative to the battery receiving space.

In other words, the amount of movement of the seating portion 11 relative to the battery receiving space in the first longitudinal direction may be determined by the movement of the second support plate 121*a*2, and the amount of movement and rotation of the seating portion 11 relative to the battery receiving space in the first width direction may be determined by the movement of the first support plate 121*a*1.

The guide portion 121*b* may guide movement of the support plate 121*a*. The guide portion 121*b* may include a first guide portion 121*b*1 and a second guide portion 121*b*2.

The first guide portion 121*b*1 may guide movement and rotation of the first support plate 121*a*1 relative to the second support plate 121*a*2 in the first width direction. The first guide portion 121*b*1 may be disposed on an upper surface of the second support plate 121*a*2. For example, the first guide portion 121*b*1 may include a ball shape protruding upwards from the upper surface of the second support plate 121*a*2.

In detail, when the first support plate 121*a*1 is moved or rotated in the first width direction, the ball-shaped first guide portion 121*b*1 may be rotated in a state in which the center portion thereof is fixed with respect to the second support plate 121*a*2.

An upper end portion of the first guide portion 121*b* may be rotated in place in a state of being brought into contact with a lower surface of the first support plate 121*a*1. Furthermore, the first guide portion 121*b*1 may be disposed in a recessed region which is a region recessed downward on the upper surface of the second support plate 121*a*2. The center portion of the first guide portion 121*b*1 may be located below an upper end portion of the second support plate 121*a*2.

A plurality of first guide portions 121*b*1 may be provided. The plurality of first guide portions 121*b* 121*b*1 may be spaced from each other in the first width direction and the first longitudinal direction.

The second guide portion 121*b*2 may guide movement of the second support plate 121*a*2 relative to the lift 122 in the first longitudinal direction. The second guide portion 121*b*2 may include a rail shape extending in the first longitudinal direction. A plurality of rails may be provided. The plurality of rails may be spaced from each other in the first width direction.

The bracket 121*c* may allow or restrict rotation and movement of the support plate 121*a*. When the rotation and movement of the support plate 121*a* are restricted, this may mean a state in which movement of the support plate 121*a* relative to another component is constrained even though a force is applied to the support plate 121a. The bracket 121c may include a first bracket 121c1 and a second bracket 121c2.

The first bracket 121c1 may allow or restrict rotation and movement of the first support plate 121a1. For example, when the horizontal alignment portion 121 is raised by a first lifting distance L1 or more from an initial position, the first bracket 121c1 may allow rotation and movement of the first support plate 121a1. The initial position of the horizontal alignment portion 121 may be defined as the height of the horizontal alignment portion 121 in a state in which the lift 122 does not raise the horizontal alignment portion 121. In other words, the initial position of the horizontal alignment portion 121 may refer to the lowest height at which the horizontal alignment portion 121 is able to be located.

Furthermore, when the horizontal alignment portion 121 is placed at the initial position or raised by less than the first lifting distance L1 from the initial position, the first bracket 121c1 may restrict rotation and movement of the first support plate 121a1. For example, when the horizontal alignment portion 121 is raised by less than the first lifting distance L1 from the initial position, the first bracket 121c1 may be engaged with a first engagement portion 122f1 to be described below. The first bracket 121c1 may be connected to a side of the first support plate 121a1 in the seating width direction W.

A first engagement hole 121c3 engaged with the first engagement portion 122f1 may be formed in the first bracket 121c1. The first engagement hole 121c3 may extend in the up and down direction H. The first engagement hole 121c3 may extend in the up and down direction H by the first lifting distance L1.

Furthermore, a first inclined hole 121c4 extending downwardly from a lower end portion of the first engagement hole 121c3 may be additionally formed in the first bracket 121c1. For example, when the horizontal alignment portion 121 is raised by the first lifting distance L1 or more from the initial position, the first engagement portion 122f1 may be located in the first inclined hole 121c4. The first inclined hole 121c4 may include a shape in which the width is increased downward.

A plurality of first brackets 121c1 may be provided. The plurality of first brackets 121c1 may be disposed on opposite sides of the first support plate 121a1 in the seating width direction W and may be spaced from each other.

The second bracket 121c2 may allow or restrict movement of the second support plate 121a2. For example, when the horizontal alignment portion 121 is raised by a second lifting distance L2 or more from the initial position, the second bracket 121c2 may allow movement of the second support plate 121a2.

Furthermore, when the horizontal alignment portion 121 is placed at the initial position or raised by less than the second lifting distance L2 from the initial position, the second bracket 121c2 may restrict rotation and movement of the first support plate 121a1. For example, when the horizontal alignment portion 121 is raised by less than the second lifting distance L2 from the initial position, the second bracket 121c2 may be engaged with a second engagement portion 122f2 to be described below. The second bracket 121c2 may be connected to a side of the second support plate 121a2 in the first longitudinal direction. For example, the second bracket 121c2 may be connected to only one side and an opposite side of the second support plate 121a2 in the first longitudinal direction. A lower portion of the second bracket 121c2 may be accommodated in an internal space 13a of the unmanned transport vehicle 13 when the horizontal alignment portion 121 is placed at the initial position. For example, when the horizontal alignment portion 121 is raised with a predetermined distance from the initial position, the lower portion of the second bracket 121c2 may escape from the internal space 13a.

A second engagement hole 121c5 engaged with the second engagement portion 122f2 may be formed in the second bracket 121c2. The second engagement hole 121c5 may extend in the up and down direction H. The second engagement hole 121c5 may extend in the up and down direction H by the second lifting distance L2.

The second lifting distance L2 may be greater than the first lifting distance L1. For example, while the horizontal alignment portion 121 is raised from the initial position, the first support plate 121a1 and the second support plate 121a2 may be allowed to sequentially move.

Furthermore, a second inclined hole 121c6 extending downwardly from a lower end portion of the second engagement hole 121c5 may be additionally formed in the second bracket 121c2. For example, when the horizontal alignment portion 121 is raised by the second lifting distance L2 or more from the initial position, the second engagement portion 122f2 may be located in the second inclined hole 121c6. The second inclined hole 121c6 may include a shape in which the width is increased downward.

The lift 122 may raise and lower the horizontal alignment portion 121 relative to the unmanned transport vehicle 13. Furthermore, the lift 122 may align the relative positions of the battery accommodated in the seating space 11a and the battery receiving space in the up and down direction H. For example, the lift 122 may allow the battery to approach the battery receiving space so that the separation distance between the battery accommodated in the seating space 11a and the battery receiving space in the up and down direction H is decreased. The lift 122 may include a lift body 122a, a lift chain 122b, a lift sprocket 122c, a posture maintaining portion 122d, a motor 122e, and an engagement portion 122f.

Referring again to FIG. 4, the lift body 122a may accommodate the lift chain 122b, the lift sprocket 122c, and the posture maintaining portion 122d therein. The lift body 122a may be accommodated in the internal space 13a. The lift body 122a may be supported by the unmanned transport vehicle 13. The lift body 122a may be construed as a concept included in the unmanned transport vehicle 13.

The lift chain 122b may press the seating portion 11 upward to raise the seating portion 11. For example, the lift chain 122b may press a lower portion of the horizontal alignment portion 121 upward to raise the seating portion 11.

The lift chain 122b may be accommodated in the internal space 13a when the seating portion 11 is lowered to the maximum. When the seating portion 11 is lowered to the maximum, it may mean the same state as when the horizontal alignment portion 121 is placed at the initial position. The lift chain 122b may be withdrawn upwards from the internal space 13a when raising the seating portion 11.

The lift sprocket 122c may be rotated while being engaged with the lift chain 122b. For example, the lift sprocket 122c may be rotated about a rotation axis extending in the first width direction. For example, when the lift sprocket 122c is rotated in a first rotation direction, one end portion of the lift chain 122b may be moved upwards. Furthermore, when the lift sprocket 122c is rotated in a second rotation direction opposite to the first rotation direction, the one end portion of the lift chain 122b may be moved downward. The one end portion of the lift chain 122b may be defined as a portion of the lift chain 122b that presses the horizontal alignment portion 121.

The posture maintaining portion 122d may maintain an upright posture of the lift chain 122b while the lift chain 122b is withdrawn from the internal space 13a. For example, the posture maintaining portion 122d may prevent the lift chain 122b from being inclined with respect to the up and down direction H when the lift chain 122b is withdrawn upwards from the internal space 13a.

An upper portion of the posture maintaining portion 122d may be fixed to a lower end portion of the horizontal alignment portion 121. Furthermore, a lower portion of the posture maintaining portion 122d may be supported on the unmanned transport vehicle 13 to be movable. For example, the posture maintaining portion 122d may be moved in the up and down direction H along a lifting and lowering guide hole which is formed in the lift body 122a in the up and down direction H.

A plurality of posture maintaining portions 122d may be provided. For example, the plurality of posture maintaining portions 122d may be spaced from each other in the first longitudinal direction. As the plurality of posture maintaining portions 122d are spaced from each other in the first longitudinal direction, the lift chain 122b may be prevented from being inclined to one side or an opposite side in the first longitudinal direction when the lift chain 122b is withdrawn upwards from the internal space 13a.

The motor 122e may rotate the lift sprocket 122c in one of the first rotation direction and the second rotation direction. The motor 122e may be controlled by the transfer controller 16.

The engagement portion 122f may be selectively engaged with the bracket 121c. The engagement portion 122f may be connected to an upper portion of the lift body 122a. A plurality of engagement portions 122f may be provided. The plurality of engagement portions 122f may include the first engagement portion 122f1 and the second engagement portion 122f2.

The first engagement portion 122f1 may be selectively engaged with the first bracket 121c1. A plurality of first engagement portions 122f1 may be provided to correspond to the plurality of first brackets 121c1. The plurality of first engagement portions 122f1 may be spaced from each other in the first longitudinal direction. For example, the first engagement portions 122f1 may be fixed to one side and an opposite side of an upper surface of the lift body 122a in the first longitudinal direction.

The second engagement portion 122f2 may be selectively engaged with the second bracket 121c2. The second engagement portion 122f2 may be fixed to one side of the upper portion of the lift body 122a in the first width direction. The second engagement portion 122f2 may be disposed below the first engagement portion 122f1.

The unmanned transport vehicle 13 may horizontally move the seating portion 11 and the position alignment portion 12 to a target position. The unmanned transport vehicle 13 may move the position alignment portion 12 to the place below the vehicle. For example, the unmanned transport vehicle 13 may allow the battery to approach the battery receiving space so that the battery accommodated in the seating space 11a and the battery receiving space face each other. The unmanned transport vehicle 13 may be referred to as an "automated guided vehicle (AGV)". The unmanned transport vehicle 13 may be controlled by the transfer controller 16.

The driving device 14 may drive the support plate 121a. For example, the driving device 14 may move or rotate the first support plate 121a1 relative to the second support plate 121a2 in the first width direction. For example, the driving device 14 may move the second support plate 121a2 relative to the lift 122 in the first longitudinal direction. The driving device 14 may include a motor, an actuator, or the like. The driving device 14 may be controlled by the transfer controller 16.

Figure 7:
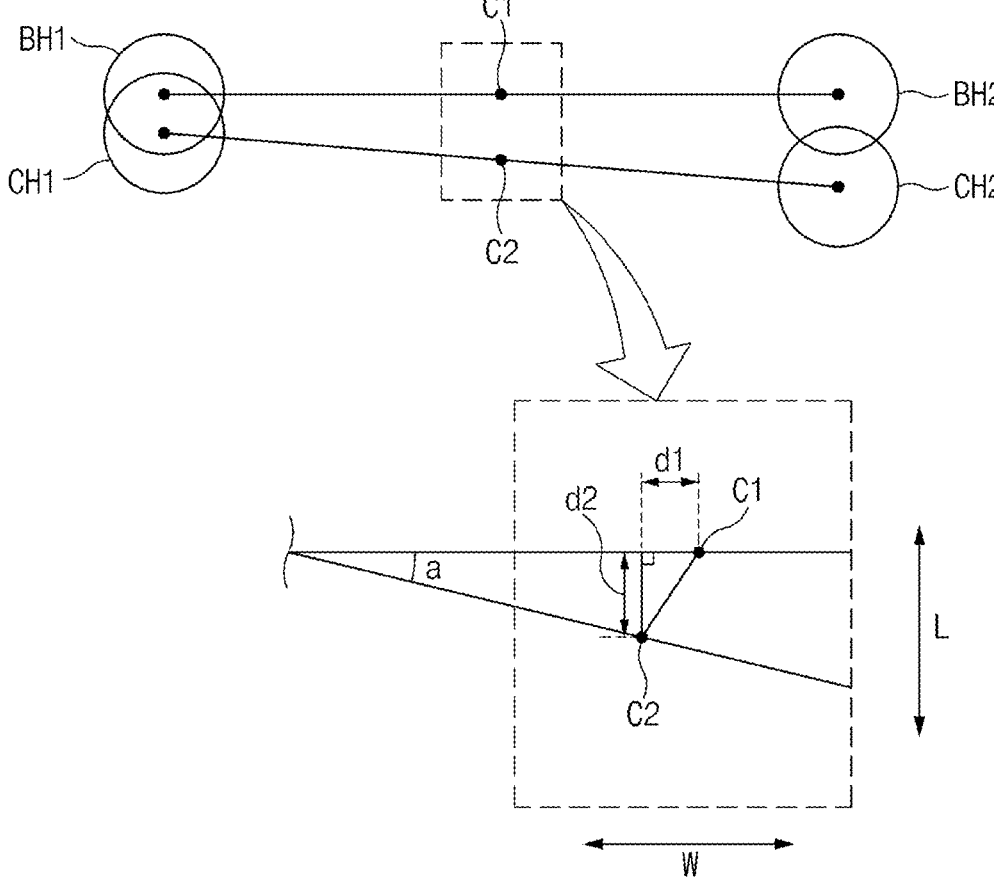
FIG. 7 is a view exemplarily illustrating a battery hole and a vehicle hole according to an exemplary embodiment of the present disclosure.

Referring further to FIG. 7, the position sensor 15 may detect the positions of a battery hole and a vehicle hole. For example, the position sensor 15 may be a camera configured for taking images of the battery hole and the vehicle hole. The position sensor 15 may be disposed below the battery hole and the vehicle hole. The position sensor 15 may include a first position sensor and a second position sensor.

The first position sensor may detect the position of a first battery hole BH1 formed on one side of the battery in the width direction and the position of a first vehicle hole CH1 formed on one side of the vehicle in the width direction. For example, the first position sensor may take images of the first battery hole BH1 and the first vehicle hole CH1.

The second position sensor may detect the position of a second battery hole BH2 formed on an opposite side of the battery in the width direction and the position of a second vehicle hole CH2 formed on an opposite side of the vehicle in the width direction. For example, the second position sensor may take images of the second battery hole BH2 and the second vehicle hole CH2.

The transfer controller 16 may be configured to determine a correction value required to align the battery and the battery receiving space with respect to a horizontal direction, based on a detection result of the position sensor 15. The transfer controller 16 may be configured to determine a first distance correction value d1, a second distance correction value d2, and an angle correction value "a", based on the detection result of the position sensor 15.

The first distance correction value d1 may mean the separation distance between a battery mid-point C1 and a vehicle mid-point C2 in the seating length direction L. The battery mid-point C1 may mean a mid-point between the first battery hole BH1 and the second battery hole BH2. In more detail, the battery mid-point C1 may be defined as a center portion point of a virtual segment line extending between the center portion of the first battery hole BH1 and the center portion of the second battery hole BH2.

The vehicle mid-point C2 may mean a mid-point between the first vehicle hole CH1 and the second vehicle hole CH2. In more detail, the vehicle mid-point C2 may be defined as a center portion point of a virtual segment line extending between the center portion of the first vehicle hole CH1 and the center portion of the second vehicle hole CH2.

The second distance correction value d2 may mean the separation distance between the battery mid-point C1 and the vehicle mid-point C2 in the seating width direction W.

The angle correction value "a" may mean the angle formed by a battery line and a vehicle line with respect to a horizontal direction. For example, the angle correction value "a" may mean the angle formed by the battery line and the vehicle line when the battery transfer apparatus 10 is viewed in the up and down direction H.

The battery line may be defined as a virtual straight line passing through the center portion of the first battery hole BH1 and the center portion of the second battery hole BH2. The vehicle line may be defined as a virtual straight line passing through the center portion of the first vehicle hole CH1 and the center portion of the second vehicle hole CH2.

When the seating portion 11 is subjected to first corrective movement, second corrective movement, and corrective rotation, the relative horizontal positions of the battery accommodated in the seating space 11a and the battery receiving space may be aligned. For example, in the case in which the relative horizontal positions of the battery accommodated in the seating space 11a and the battery receiving space are aligned, the battery hole and the vehicle hole may overlap each other when projected onto each other in the up and down direction H.

The first corrective movement may mean movement of the battery mid-point C1 toward the vehicle mid-point C2 by the determined first distance correction value d1 based on the seating length direction L.

The second corrective movement may mean movement of the battery mid-point C1 toward the vehicle mid-point C2 by the second distance correction value d2 based on the seating width direction W.

The corrective rotation may mean rotation of the first battery hole BH1 about a battery rotation axis toward the first vehicle hole CH1 by the angle correction value "a". The battery rotation axis may be defined as a rotation axis that passes through the center portion of the battery and extends in the up and down direction H.

Based on the determined first distance correction value d1, the transfer controller 16 may be configured for controlling the driving device 14 so that the second support plate 121a2 is moved relative to the lift 122. Furthermore, based on the determined second distance correction value d2 and the determined angle correction value "a", the transfer controller 16 may be configured for controlling the driving device 14 so that the first support plate 121a1 is moved relative to the second support plate 121a2.

The transfer controller 16 may be implemented with a processor which is electrically connected to the seating portion 11, the position alignment portion 12, the unmanned transport vehicle 13, and the driving device 14 and which is configured for decoding and executing a command based on previously input information.

Hereinafter, the lift apparatus 20 according to an exemplary embodiment of the present disclosure will be described with reference to FIGS. 8 to 18.

Figure 8:
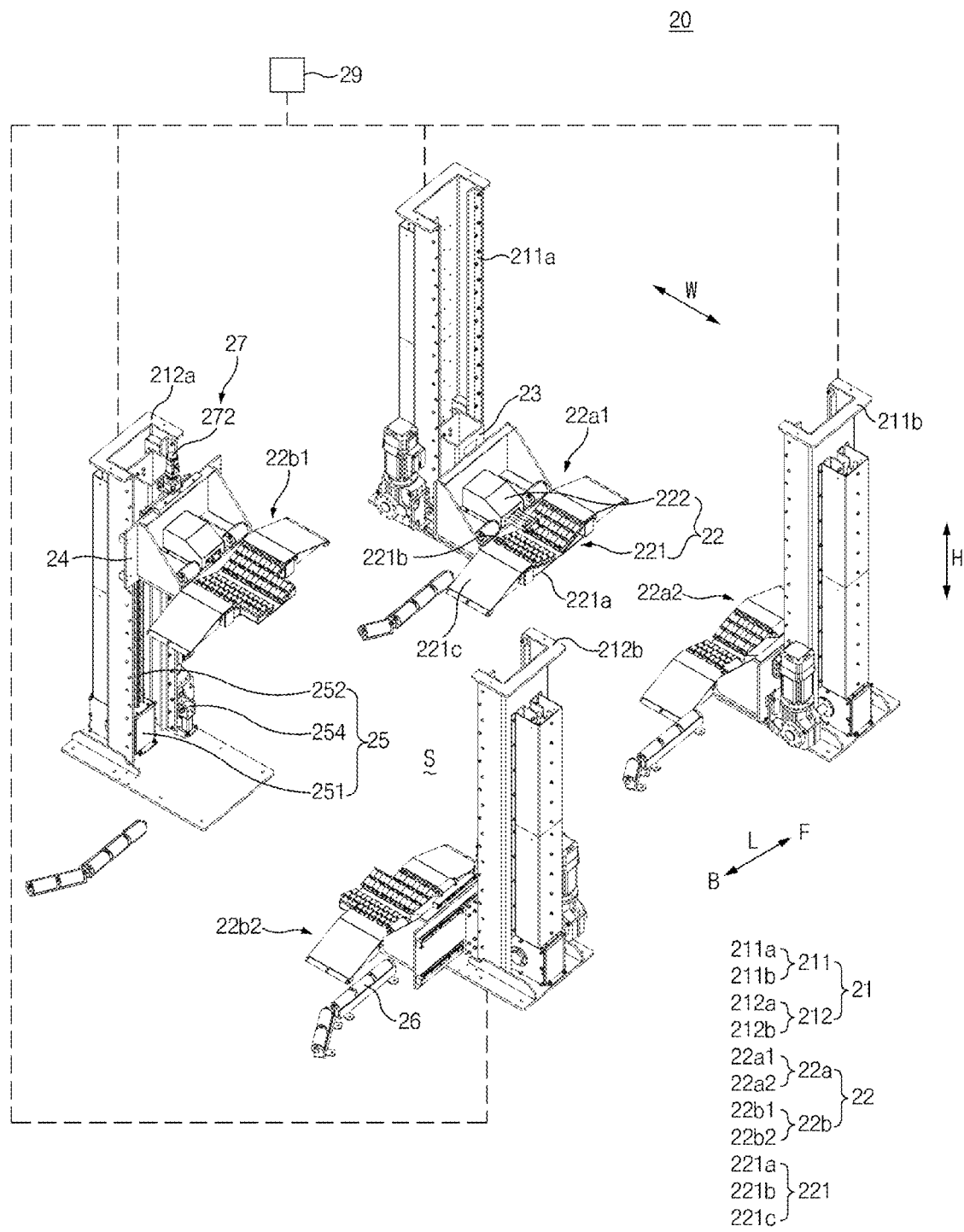
FIG. 8 is a perspective view of a lift apparatus according to an exemplary embodiment of the present disclosure.

Referring to FIG. 8, the lift apparatus 20 may raise or lower the vehicle C. The lift apparatus 20 may include a frame 21, a lifting and lowering module 22, a lifting and lowering frame 23, a length guide 24, a wheel lifter 25, an entry guide 26, an actuator 27, a wheel sensor 28, and a lifting controller 29.

Figure 9:
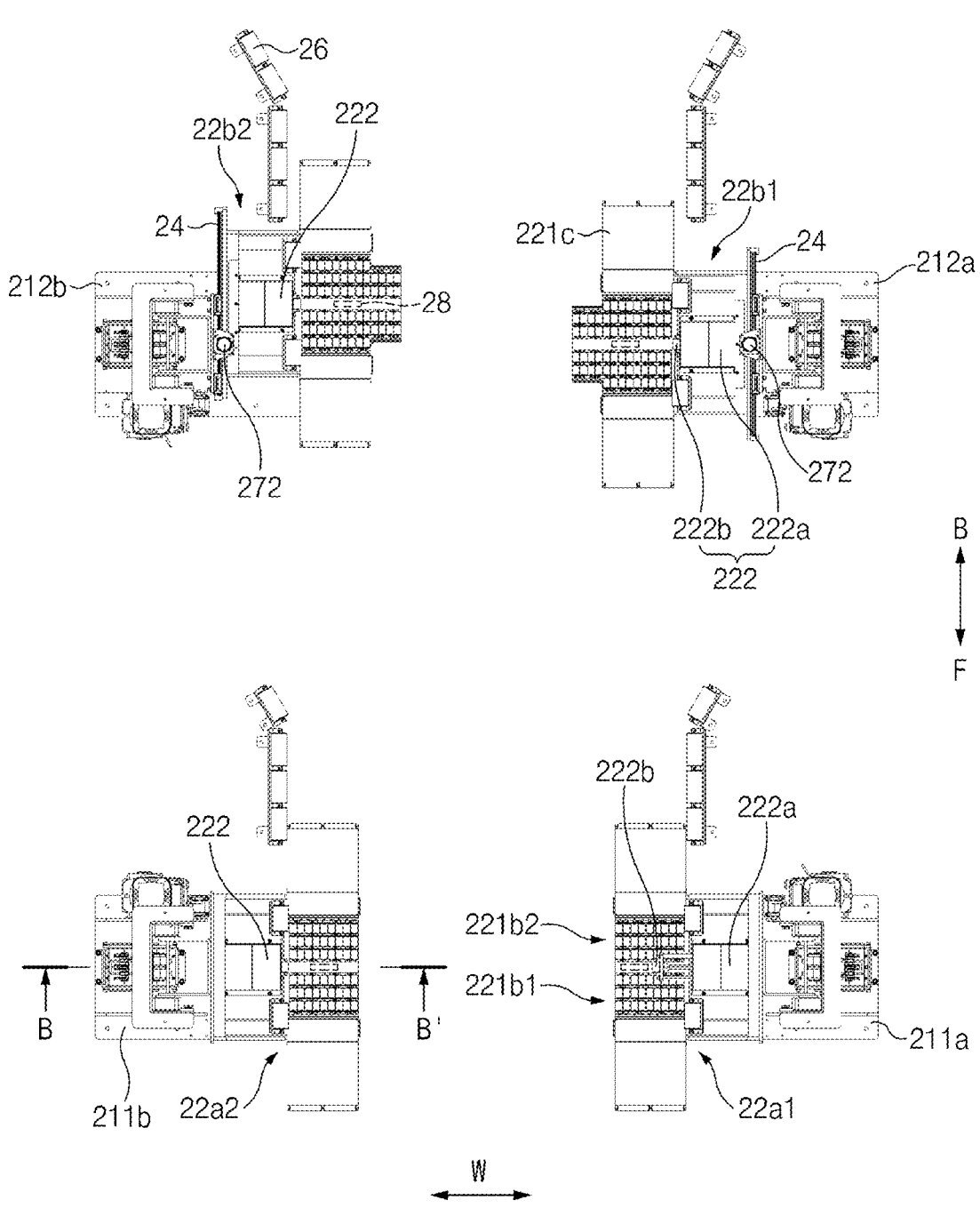
FIG. 9 is a plan view of the lift apparatus according to an exemplary embodiment of the present disclosure.
Figure 10:
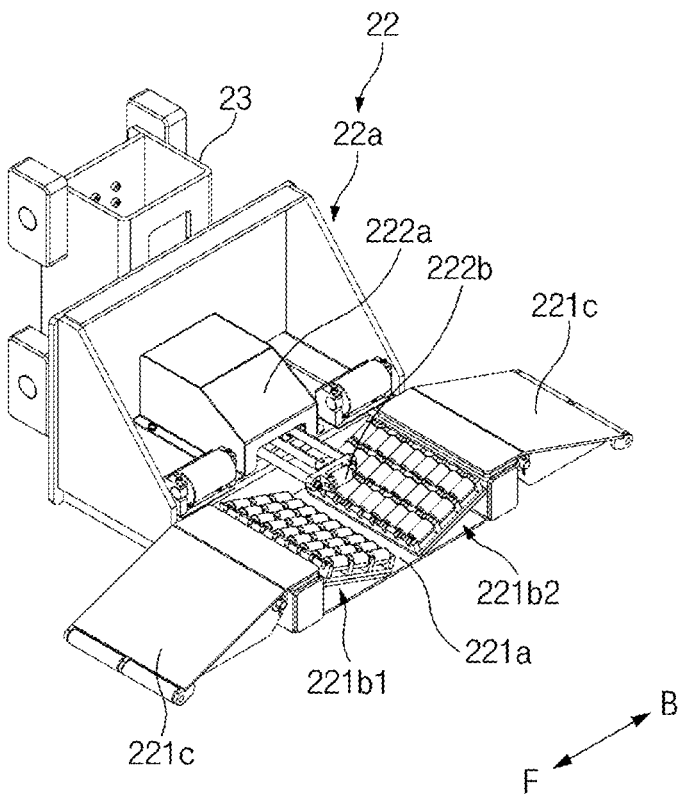
FIG. 10 is a perspective view of a first lifting and lowering module according to an exemplary embodiment of the present disclosure.
Figure 11:
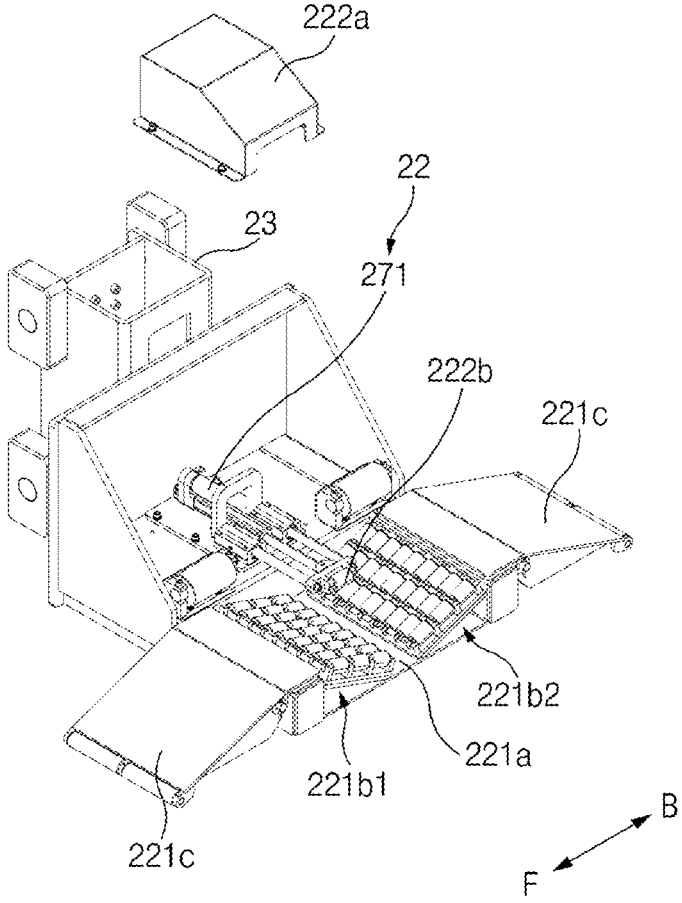
FIG. 11 is a view exemplarily illustrating a state in which a pusher cap is disassembled from the first lifting and lowering module according to an exemplary embodiment of the present disclosure.
Figure 12:
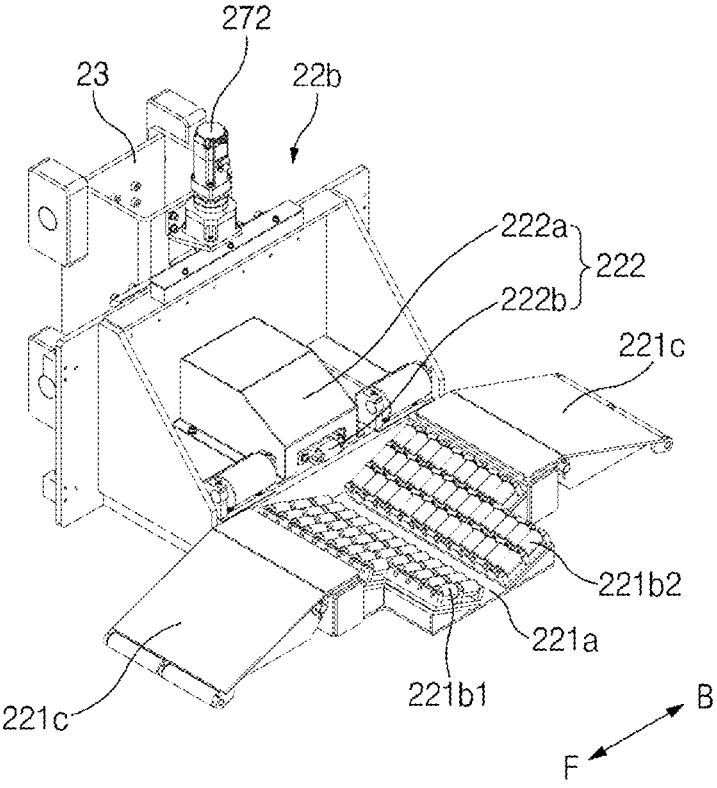
FIG. 12 is a perspective view of a second lifting and lowering module according to an exemplary embodiment of the present disclosure.
Figure 13:
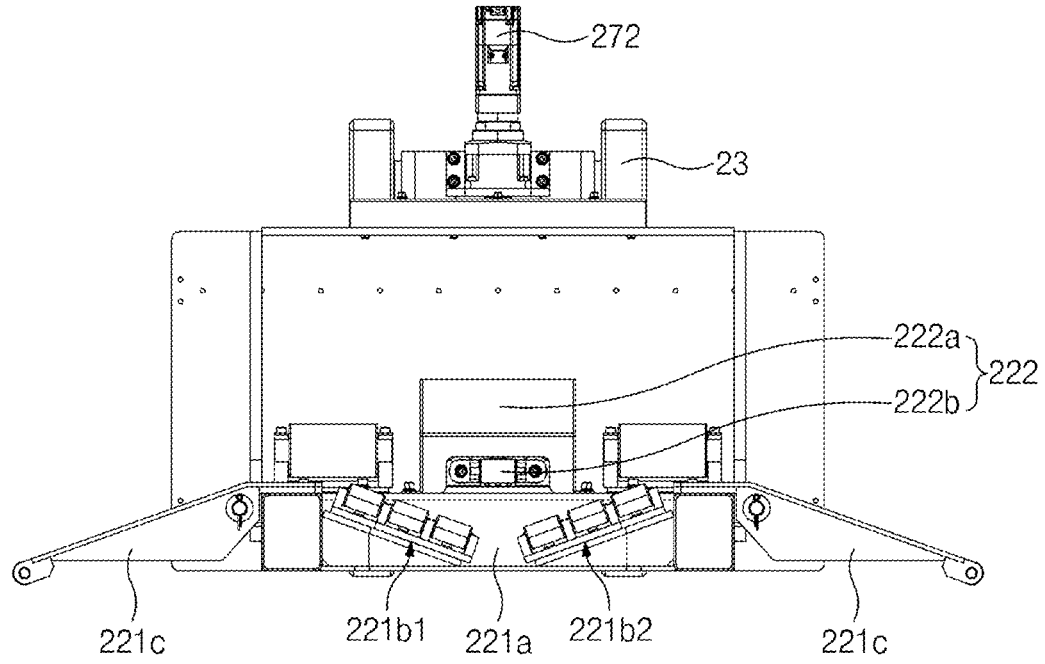
FIG. 13 is a front view of the second lifting and lowering module according to an exemplary embodiment of the present disclosure.
Figure 14:
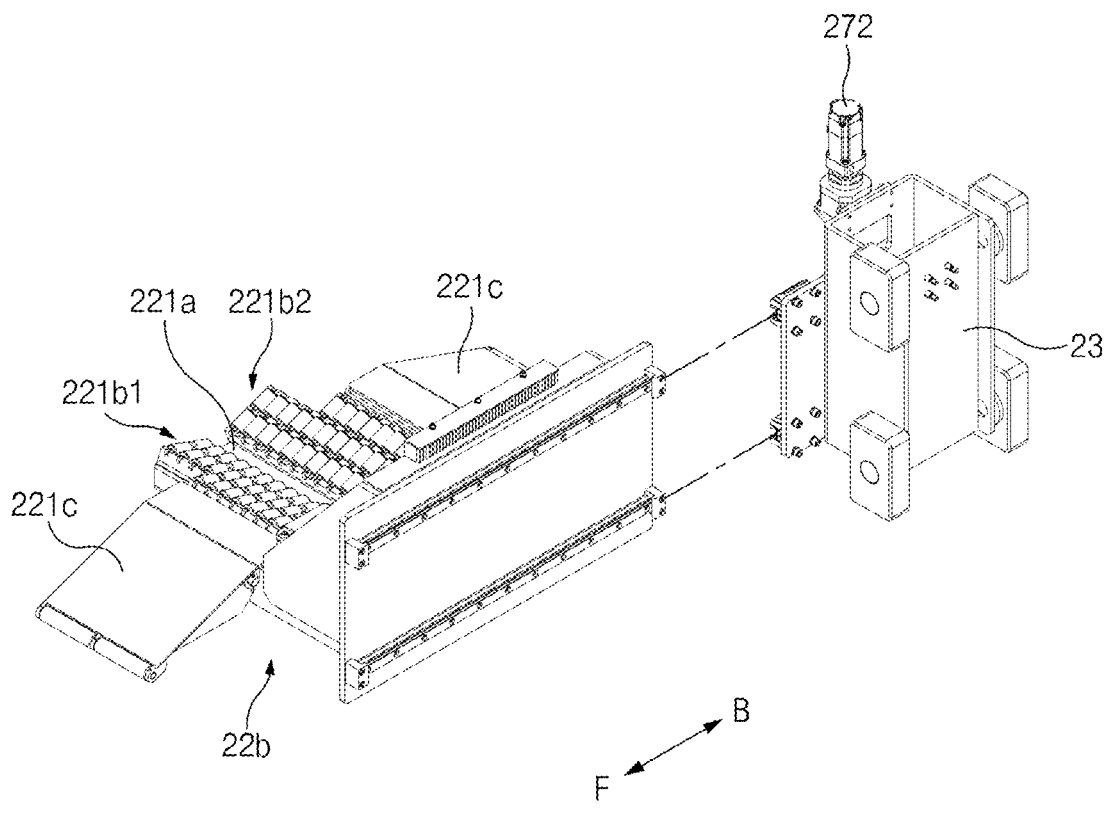
FIG. 14 is a perspective view of the second lifting and lowering module, a length guide, and a lifting and lowering frame according to an exemplary embodiment of the present disclosure.
Figure 15:
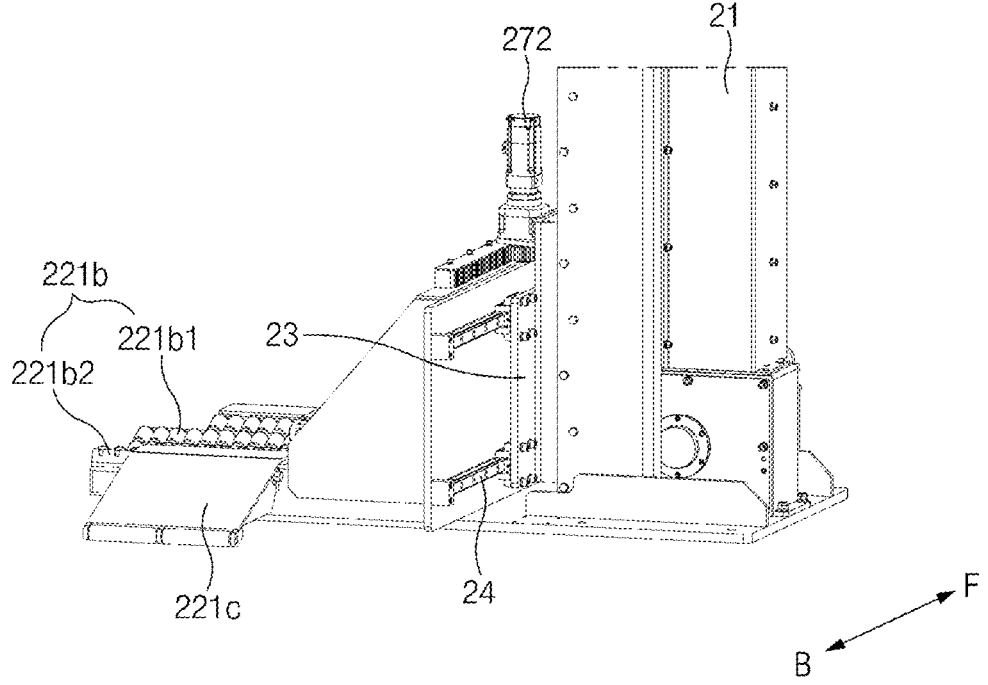
FIG. 15 is a side perspective view of the second lifting and lowering module according to an exemplary embodiment of the present disclosure.

Referring further to FIG. 9, the frame 21 may provide an entry space S that the vehicle required to be lifted enters. The frame 21 may be fixed to a predetermined station where battery swapping is performed. The frame 21 may support the lifting and lowering module 22, the lifting and lowering frame 23, the length guide 24, the wheel lifter 25, and the actuator 27.

A plurality of frames 21 may be provided. The plurality of frames 21 may be spaced from each other in an entry width direction W that corresponds to a width direction of the entry space S and forward and backward directions F and B that correspond to a longitudinal direction of the entry space S. The direction in which the vehicle enters the entry space S may be defined as the forward direction F, and the backward direction B may be defined as the direction opposite to the forward direction F.

For example, four frames 21 may be provided. However, without being limited thereto, two frames 21 may be provided. The plurality of frames 21 may include a front frame 211 and a rear frame 212.

The front frame 211 may be disposed on the front (F) side of the entry space S. A plurality of front frames 211 may be provided. The plurality of front frames 211 may include a first front frame 211a and a second front frame 211b.

The first front frame 211a and the second front frame 211b may be spaced from each other in the entry width direction W. The first front frame 211a and the second front frame 211b may be symmetrically disposed with respect to a virtual first plane that passes through the center portion of the entry space S and is perpendicular to the entry width direction W. In other words, the first front frame 211a and the second front frame 211b may be disposed to face each other.

The rear frame 212 may be disposed on the rear (B) side of the entry space S. The rear frame 212 may be disposed to be symmetrical to the front frame 211 with respect to a virtual second plane that passes through the center portion of the entry space S and is perpendicular to the forward direction and the backward direction F and B. In other words, the rear frame 212 and the front frame 211 may be disposed to face each other. A plurality of rear frames 212 may be provided. The plurality of rear frames 212 may include a first rear frame 212a and a second rear frame 212b.

The first rear frame 212a and the second rear frame 212b may be spaced from each other in the entry width direction W. The first rear frame 212a and the second rear frame 212b may be symmetrically disposed with respect to the first plane. In other words, the first rear frame 212a and the second rear frame 212b may be disposed to face each other.

In the present specification, the first front frame 211a, the second front frame 211b, the first rear frame 212a, the second rear frame 212b may be referred to as the front left frame, the front right frame, the rear left frame, and the rear right frame, respectively.

Referring further to FIG. 10, FIG. 11, FIG. 12, FIG. 13, FIG. 14 and FIG. 15, the lifting and lowering module 22 may raise and lower the vehicle entering the entry space S relative to the frame 21. The lifting and lowering module 22 may be connected to the frame 21 to be raised and lowered relative to the frame 21. The lifting and lowering module 22 may include a wheel support portion 221 and a pusher 222.

The wheel support portion 221 may support a wheel of the vehicle entering the entry space S. The wheel support portion 221 may include a base 221a, a roller portion 221b, and an inclined plate 221c. The base 221a may form a lower portion, a front (F) side, and a rear (B) side of the wheel support portion 221. The base 221a may include a shape surrounding opposite sides of the roller portion 221b in the forward direction and the backward direction thereof. The base 221a may extend in the entry width direction W.

The roller portion 221b may include a roller that rotates about a roller rotation axis extending in a direction perpendicular to the entry width direction W. The roller rotation axis may be directed in a direction which is not aligned with the forward direction and the backward direction thereof. In other words, the roller rotation axis may be directed in a direction which is perpendicular to the entry width direction W and is not in parallel to the forward direction and the backward direction thereof. A plurality of rollers may be included in the roller portion 221b.

The roller portion 221b may be connected to the base 221a to be located above the base 221a. The roller portion 221b may be brought into contact with a lower portion of the wheel of the vehicle entering the entry space S. The roller portion 221b may allow the wheel supported on the wheel support portion 221 to be moved in the entry width direction W.

The roller portion 221*b* may include a shape recessed downward. For example, when the roller portion 221*b* is viewed in the entry width direction W, the roller portion 221*b* may include a shape in which the width in an entry length direction is decreased downward. The roller portion 221*b* may include a first rolling region 221*b*1 and a second rolling region 221*b*2.

The first rolling region 221*b*1 may form a front (F) side of the roller portion 221*b*. The first rolling region 221*b*1 may obliquely extend in the forward direction and the backward direction so that a front end portion thereof is disposed above a rear end portion. For example, the first rolling region 221*b*1 may extend in a first inclined direction to be upwardly inclined toward the front (F) side thereof.

The first rolling region 221*b*1 may include a plurality of first rollers. The first rollers may rotate about a first roller rotation axis. The first roller rotation axis may be a virtual straight line extending in the first inclined direction.

The second rolling region 221*b*2 may form a rear (B) side of the roller portion 221*b*. The second rolling region 221*b*2 may obliquely extend in the forward direction and the backward direction so that a rear end portion thereof is disposed above a front end portion thereof. For example, the second rolling region 221*b*2 may extend in a second inclined direction to be downwardly inclined toward the front (F) side thereof.

The second rolling region 221*b*2 may include a plurality of second rollers. The second rollers may rotate about a second roller rotation axis. The second roller rotation axis may be a virtual straight line extending in the second inclined direction.

The first rolling region 221*b*1 and the second rolling region 221*b*2 may be formed to be symmetrical to each other with respect to a virtual plane that passes through the center portion of the base 221*a* and is perpendicular to the forward direction and the backward direction thereof.

The inclined plate 221*c* may provide an inclined surface for guiding the vehicle entering the entry space S to the roller portion 221*b*. A plurality of inclined plates 221*c* may be provided. The plurality of inclined plates 221*c* may include a first inclined plate and a second inclined plate.

An inclined surface of the first inclined plate may obliquely extend to be downwardly inclined toward the front (F) side. A. A rear end portion of the first inclined plate may be connected to an upper end portion of a front region of the base 221*a* to be rotatable. The front region of the base 221*a* may refer to a region located on the front (F) side of the first rolling region 221*b*1. A roller rotatable about a rotation axis extending in the entry width direction W may be provided on a front end portion of the first inclined plate.

An inclined surface of the second inclined plate may obliquely extend to be downwardly inclined toward the rear (B) side. Thereof A front end portion of the second inclined plate may be connected to an upper end portion of a rear region of the base 221*a* to be rotatable. The rear region of the base 221*a* may refer to a region located on the rear (B) side of the second rolling region 221*b*2. A roller rotatable about a rotation axis extending in the entry width direction W may be provided on a rear end portion of the second inclined plate.

Referring again to FIG. 10, and FIG. 11, the pusher 222 may press the wheel supported on the wheel support portion 221 in a pressing direction. The pressing direction may be defined as a direction which is parallel to the entry width direction W and in which the frame 21 faces toward the center portion of the entry space S. The pusher 222 may be disposed on a side of the roller portion 221*b* in an opposite pressing direction. The opposite pressing direction may be defined as the direction opposite to the pressing direction. The pusher 222 may be disposed above the roller portion 221*b*.

The pusher 222 may align a first lateral center portion which is the center portion of the entry space in the width direction and a second lateral center portion which is the center portion of the vehicle in the width direction. When the first lateral center portion and the second lateral center portion are aligned with each other, this may mean a state in which a virtual straight line passing through the first lateral center portion and extending in the forward direction and the backward direction and a virtual straight line passing through the second lateral center portion and extending in the longitudinal direction of the vehicle are in parallel to each other. The pusher 222 may include a pusher cap 222*a* and a contact block 222*b*.

The pusher cap 222*a* may form an exterior of the pusher 222. When the pusher 222 presses the vehicle, at least a portion of the contact block 222*b* may be brought into contact with the wheel of the vehicle. For example, in a misaligned state in which the wheel supported on the wheel support portion 221 is inclined with respect to the forward direction and the backward direction, the contact block 222*b* may be brought into contact with only a portion of the wheel in the misaligned state. Meanwhile, a contact area between the wheel and the contact block 222*b* may be gradually increased while the misaligned state is switched to an aligned state (a state in which the wheel supported on the wheel support portion 221 is directed parallel to the forward direction and the backward direction) by a pressing operation of the push 222.

The contact block 222*b* may be configured to move forward or backward relative to the pusher cap 222*a* in the entry width direction W. For example, the contact block 222*b* may move forward relative to the push cap 222*a* in the pressing direction, or may move backward relative to the pusher cap 222*a* in the opposite pressing direction. The contact block 222*b* may extend in the forward direction and the backward direction. Thereof. Furthermore, the contact block 222*b* may include, for example, a roller rotatable about a rotation axis extending in the forward direction and the backward direction thereof. The contact block 222*b* may be moved forward or backward relative to the pusher cap 222*a* by a pressing actuator 271 to be described below. For example, the pressing actuator 271 may be included in the pusher 222.

A plurality of lifting and lowering modules 22 may be provided. The plurality of lifting and lowering modules 22 may correspond to the plurality of frames 21, respectively. For example, the number of lifting and lowering modules 22 may be equal to the number of frames 21. The plurality of lifting and lowering modules 22 may include a first lifting and lowering module 22*a* and a second lifting and lowering module 22*b*.

Referring again to FIG. 10, and FIG. 11, the position of the first lifting and lowering module 22*a* relative to the frame 21 in the forward direction and the backward direction may be fixed. For example, the first lifting and lowering module 22*a* may be connected to the front frame 211 to be raised and lowered.

The first lifting and lowering module 22*a* may raise and lower one of a front (F) side wheel and a rear (B) side wheel of the vehicle. For example, the first lifting and lowering module 22*a* may raise and lower the front (F) side wheel of the vehicle. However, without being limited thereto, the first lifting and lowering module 22a may raise and lower the rear (B) side wheel of the vehicle.

A first roller portion which is a roller portion of the first lifting and lowering module 22a may extend in the entry width direction W by a first roller length. A second roller portion which is a roller portion of the second lifting and lowering module 22b may extend in the entry width direction W by a second roller length. The first roller length and the second roller length may differ from each other. For example, the first roller length may be shorter than the second roller length.

In detail, based on the entry width direction W, an end portion of the first roller portion 1 in the pressing direction may be disposed in the opposite pressing direction when compared to an end portion of the second roller portion in the pressing direction. Furthermore, based on the entry width direction W, an end portion of the first roller portion in the opposite pressing direction may correspond to an end portion of the second roller portion in the opposite pressing direction. In other words, the end portion of the first roller portion in the opposite pressing direction and the end portion of the second roller portion in the opposite pressing direction may not be spaced from each other in the entry width direction W.

The end portion of the first roller portion in the pressing direction and an end portion of a first base in the pressing direction may not be spaced from each other in the entry width direction W, in which the first base is a base of the first lifting and lowering module 22a. Furthermore, the end portion of the second roller portion in the pressing direction may include a shape protruding in the pressing direction from an end portion of a second base that faces in the pressing direction, in which the second base is a base of the second lifting and lowering module 22b.

The first lifting and lowering module 22a may include a (1-1)th lifting and lowering module 22a1 and a (1-2)th lifting and lowering module 22a2. The (1-1)th lifting and lowering module 22a1 may be connected to the front left frame to be raised and lowered. The (1-1)th lifting and lowering module 22a1 may raise and lower the wheel provided on the front left side of the vehicle. The (1-1)th lifting and lowering module 22a1 may be referred to as the front left lifting and lowering module.

The (1-2)th lifting and lowering module 22a2 may be connected to the front right frame to be raised and lowered. The (1-2)th lifting and lowering module 22a2 may raise and lower the wheel provided on the front right side of the vehicle. The (1-2)th lifting and lowering module 22a2 may be referred to as the front right lifting and lowering module.

Referring again to FIGS. 12 and 15, the second lifting and lowering module 22b may be moved relative to the frame 21 in the forward direction and the backward direction thereof. Meanwhile, the spirit and scope of the present disclosure is not limited thereto, and at least one of the first lifting and lowering module 22a or the second lifting and lowering module 22b may be moved relative to the frame 21 in the forward direction and the backward direction thereof.

The second lifting and lowering module 22b may raise and lower the other one of the front (F) side wheel and the rear (B) side wheel of the vehicle. For example, the second lifting and lowering module 22b may raise and lower the rear (B) side wheel of the vehicle, and the first lifting and lowering module 22a may raise and lower the front (F) side wheel of the vehicle. However, without being limited thereto, the second lifting and lowering module 22b may raise and lower the front (F) side wheel of the vehicle, and the first lifting and lowering module 22a may raise and lower the rear (B) side wheel of the vehicle. The second lifting and lowering module 22b may include a (2-1)th lifting and lowering module 22b1 and a (2-2)th lifting and lowering module 22b2.

The (2-1)th lifting and lowering module 22b1 may be connected to the rear left frame to be raised and lowered. The (2-1)th lifting and lowering module 22b1 may raise and lower the wheel provided on the rear left side of the vehicle. The (2-1)th lifting and lowering module 22b1 may be referred to as the rear left lifting and lowering module.

The (2-2)th lifting and lowering module 22b2 may be connected to the rear right frame to be raised and lowered. The (2-2)th lifting and lowering module 22b2 may raise and lower the wheel provided on the rear right side of the vehicle. The (2-2)th lifting and lowering module 22b2 may be referred to as the rear right lifting and lowering module.

The lifting and lowering frame 23 may be connected to the frame 21 to be raised and lowered. For example, a side of the lifting and lowering frame 23 in the opposite pressing direction may be connected to the frame 21 to be raised and lowered. In more detail, the lifting and lowering frame 23 may be connected to a wheel lifting chain 252 to be described below.

The lifting and lowering frame 23 may be connected to the lifting and lowering module 22. For example, a side of the lifting and lowering frame 23 in the pressing direction may be connected to the lifting and lowering module 22. A plurality of lifting and lowering frames 23 may be provided to correspond to the plurality of lifting and lowering modules 22, respectively. The second lifting and lowering module 22b may be moved in the forward direction and the backward direction relative to the lifting and lowering frame 23 corresponding to the second lifting and lowering module 22b.

The length guide 24 may guide movement of the second lifting and lowering module 22b relative to the lifting and lowering frame 23 in the forward direction and the backward direction thereof. The length guide 24 may be disposed between the lifting and lowering frame 23 and the second lifting and lowering module 22b. For example, the length guide 24 may be a rail extending in the forward direction and the backward direction thereof. Meanwhile, the spirit and scope of the present disclosure is not limited thereto, and the length guide 24 may guide movement of the first lifting and lowering module 22a relative to the lifting and lowering frame 23 in the forward direction and the backward direction thereof. In other words, the length guide 24 may be disposed between the lifting and lowering frame 23 and the second lifting and lowering module 22b.

Figure 16:
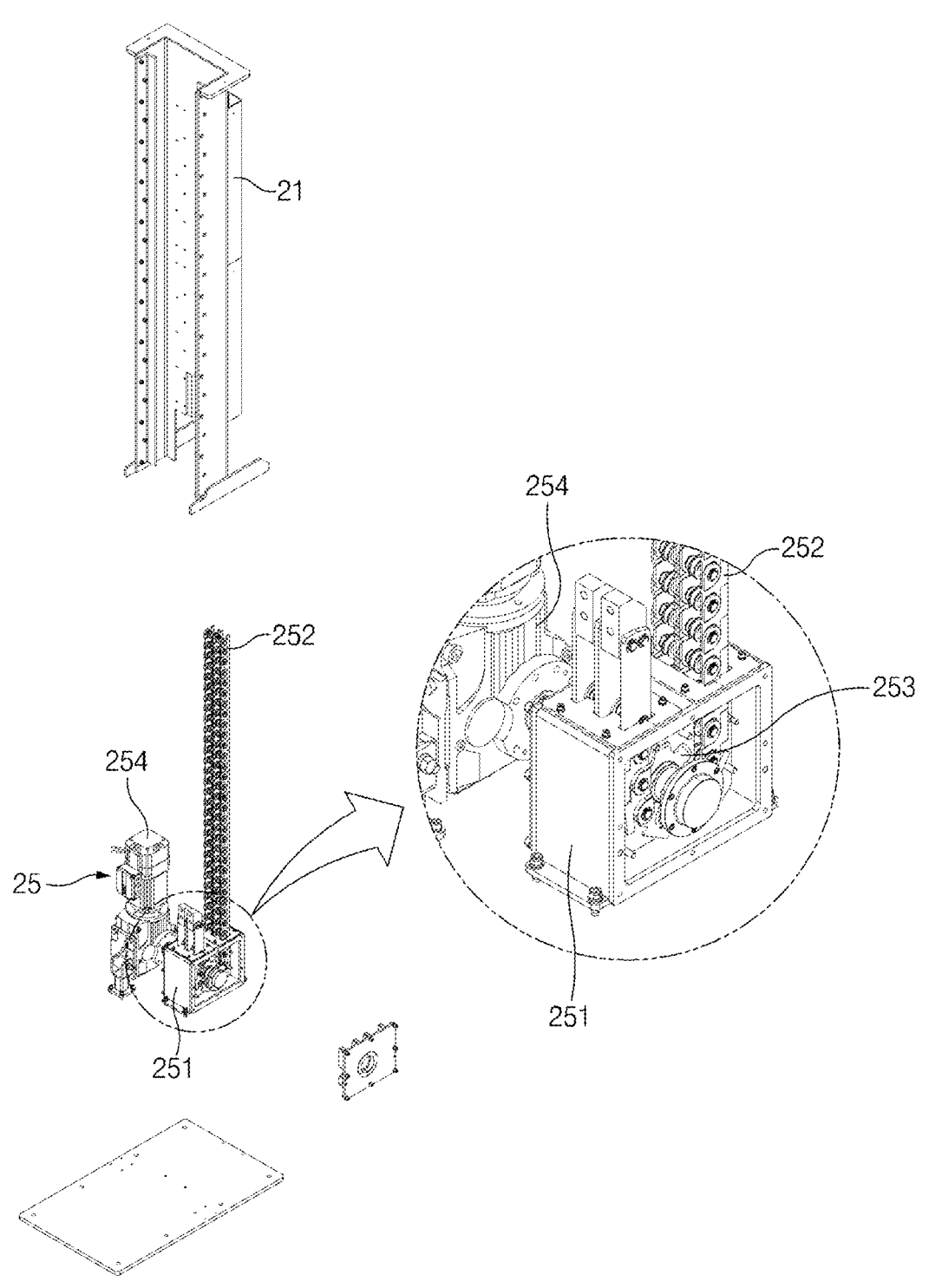
FIG. 16 is an exploded perspective view of a frame and a wheel lifter according to an exemplary embodiment of the present disclosure.
Figure 17:
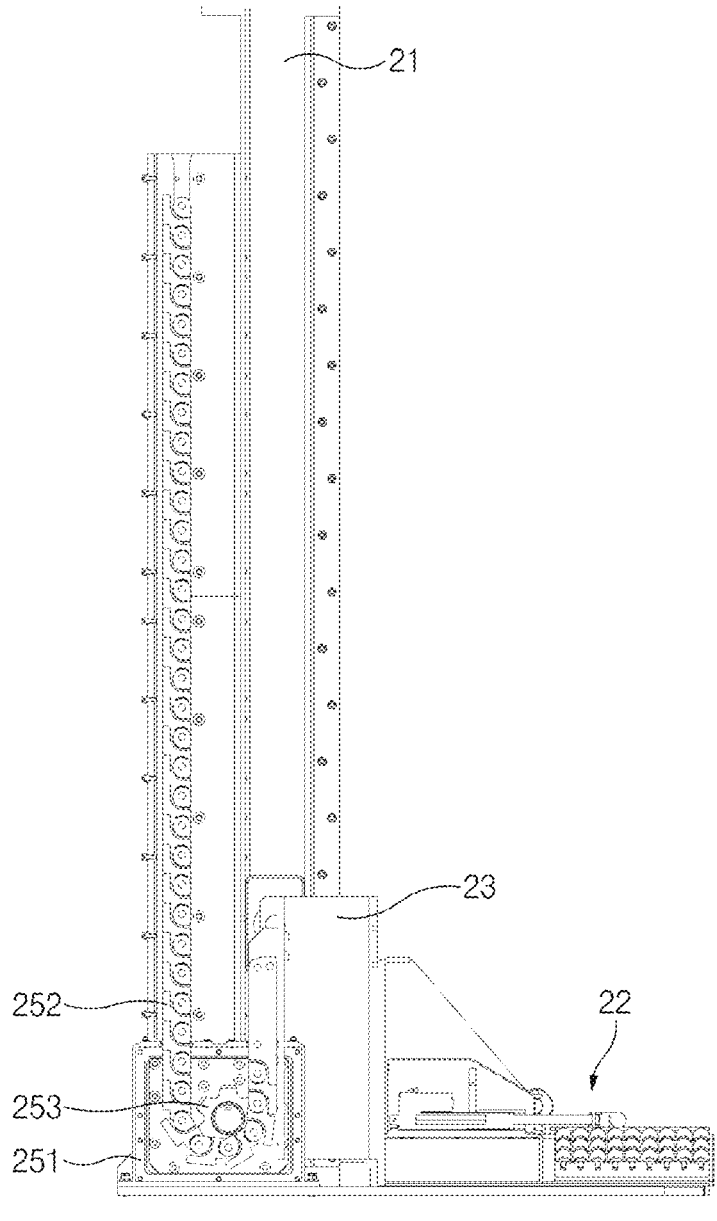
FIG. 17 is a longitudinal sectional view taken along line B-B' of FIG. 9.
Figure 18:
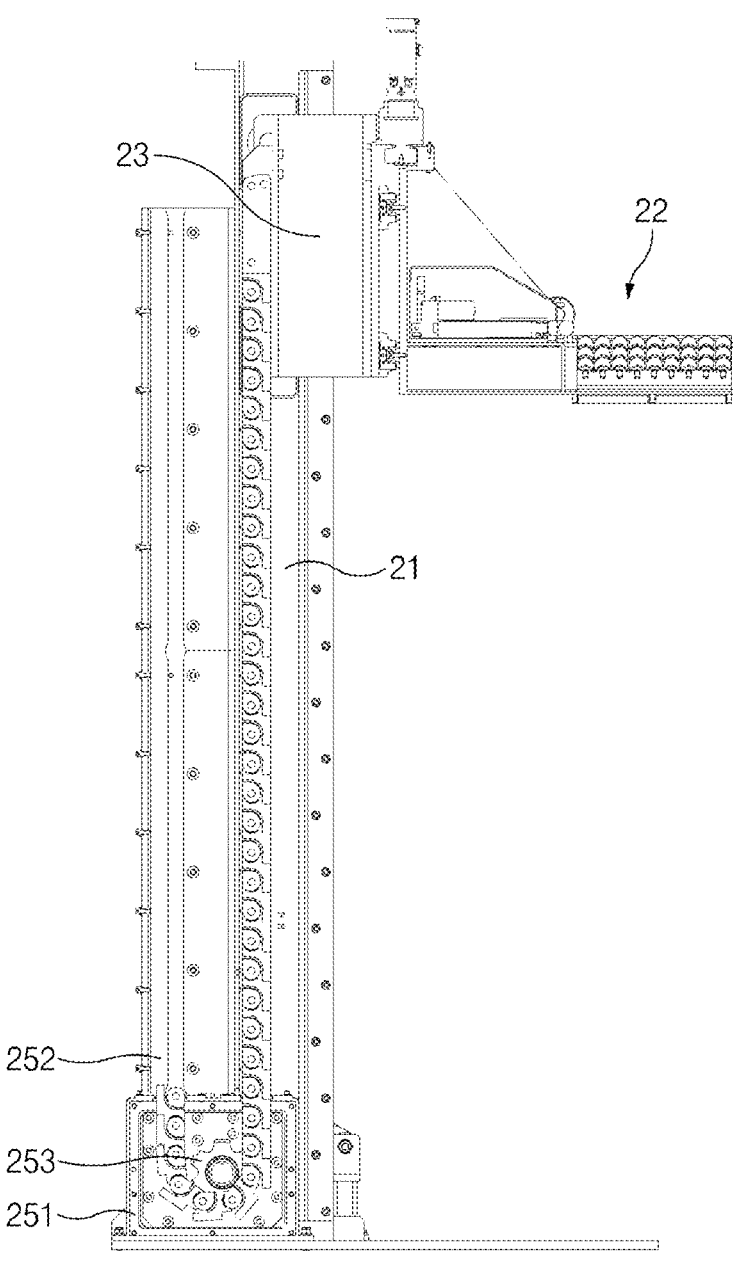
FIG. 18 is a view exemplarily illustrating a state in which a lifting and lowering module of FIG. 17 is raised.

Referring further to FIGS. 16 to 18, the wheel lifter 25 may raise and lower the lifting and lowering module 22 relative to the frame 21. The wheel lifter 25 may be supported by the frame 21. A plurality of wheel lifters 25 may be provided to correspond to the plurality of frames 21. The plurality of wheel lifters 25 may be provided in the plurality of frames 21, respectively. The wheel lifter 25 may include a wheel lifting body 251, the wheel lifting chain 252, a wheel lifting sprocket 253, and a lifter actuator 254.

The wheel lifting body 251 may accommodate a portion of the wheel lifting chain 252 and the wheel lifting sprocket 253. The wheel lifting body 251 may be disposed on a lower portion of the frame 21.

One end portion of the wheel lifting chain 252 may be connected to the lifting and lowering module 22. For example, the one end portion of the wheel lifting chain 252 may be connected to the lifting and lowering frame 23 and may provide power to the lifting and lowering module 22 connected to the lifting and lowering frame 23.

The wheel lifting chain 252, viewed in a direction perpendicular to the up and down direction H, may include a shape convex downward so that the one end portion and an opposite end portion are directed upwards. The one end portion of the wheel lifting chain 252 may refer to an upper end portion of the wheel lifting chain 252 that faces in the pressing direction, and the opposite end portion of the wheel lifting chain 252 may refer to an upper end portion of the wheel lifting chain 252 that faces in the opposite pressing direction. For example, when the wheel lifting chain 252 is viewed in the forward direction and the backward direction, a portion of the wheel lifting chain 252 accommodated in the wheel lifting body 251 may have, for example, the shape of "U".

The wheel lifting chain 252 may be singly provided. For example, only one wheel lifting chain 252 may be included in one wheel lifter 25.

The wheel lifting sprocket 253 may raise and lower the one end portion of the wheel lifting chain 252 through a rotation operation. For example, the wheel lifting sprocket 253 may be rotated about a rotation axis extending in the forward direction and the backward direction thereof.

The wheel lifting sprocket 253 may be rotated in a state of being engaged with a portion of the wheel lifting chain 252. The wheel lifting sprocket 253 may be singly provided. In other words, only one wheel lifting chain 252 and one wheel lifting sprocket 253 may be included in one wheel lifter 25.

The lifter actuator 254 may rotate the wheel lifting sprocket 253. The lifter actuator 254 may be, for example, a motor. The lifter actuator 254 may be controlled by the lifting controller 29.

The entry guide 26 may guide movement of the vehicle entering the entry space S.

The actuator 27 may be controlled by the lifting controller 29. The actuator 27 may include the pressing actuator 271 and a length actuator 272. The pressing actuator 271 may linearly move the contact block 222b in the entry width direction W. The pressing actuator 271 may be an actuator. For example, the pressing actuator 271 may include a hydraulic cylinder, a motor, or the like. Meanwhile, without being limited thereto, the pressing actuator 271 may include various driving means capable of linearly moving the contact block 222b. The pressing actuator 271 may be accommodated in the pusher cap 222a.

The length guide actuator 272 may move the second lifting and lowering module 22b relative to the lifting and lowering frame 23 in the forward direction and the backward direction thereof. The length actuator 272 may include a rack gear, a pinion gear, and a gear driving motor configured for rotating the pinion gear.

The rack gear may be connected to an upper end portion of the second lifting and lowering module 22b that faces in the opposite pressing direction. The pinion gear and the gear driving motor may be connected to a side of the lifting and lowering frame 23 that faces in the pressing direction. For example, the gear driving motor may rotate the pinion gear. The pinion gear may be rotated in a state of being engaged with the rack gear. Through the rack-pinion gear, a rotation motion of the gear driving motor may be converted into a linear motion of the second lifting and lowering module 22b in the forward direction and the backward direction thereof.

The wheel sensor 28 may measure the width of a wheel of a target vehicle, which is a vehicle to be lifted, and the wheel of the target vehicle may be supported on the wheel support portion 221. A plurality of wheel sensors 28 may be provided to correspond to the plurality of lifting and lowering modules 22, respectively. The plurality of wheel sensors 28 may independently measure the widths of four wheels of the vehicle, respectively. The plurality of wheels sensors 28 may include a (1-1)th wheel sensor configured for measuring the width of a (1-1)th wheel provided on the front left side of the vehicle, a (1-2)th wheel sensor configured for measuring the width of a (1-2)th wheel provided on the front right side of the vehicle, a (2-1)th wheel sensor configured for measuring the width of a (2-1)th wheel provided on the rear left side of the vehicle, and a (2-2)th wheel sensor configured for measuring the width of a (2-2)th wheel provided on the rear right side of the vehicle.

The plurality of wheel sensors 28 may be disposed on the bases 221a of the plurality of lifting and lowering modules 22, respectively. For example, the (1-1)th wheel sensor, the (1-2)th wheel sensor, the (2-1)th wheel sensor, and the (2-2)th wheel sensor may be sequentially disposed on the (1-1)th lifting and lowering module 22a1, the (1-2)th lifting and lowering module 22a2, the (2-1)th lifting and lowering module 22b1, and the (2-2)th lifting and lowering module 22b2, respectively.

The lift apparatus 20 may further include a scanner configured for detecting an object located in a portion of the entry space S. For example, the scanner may detect an object in a scanning region. The scanning region may be defined as a region including the entry space S when the lift apparatus 20 is viewed in the up and down direction H. The scanner may be, for example, a laser scanner.

The scanner may be disposed above an upper end portion of the roller portion 221b in an initial state in which the lifting and lowering module 22 is completely lowered (e.g., a state in which the lifting and lowering module 22 is not raised).

The scanner may be disposed between the front frame 211 and the rear frame 212 based on the forward direction and the backward direction. Thereof. Furthermore, based on the entry width direction W, the scanner may be disposed at a position that corresponds to end portions of the first front frame 211a and the first rear frame 212a that face in the pressing direction.

The lifting controller 29 may compare input widths of the wheels of the target vehicle and measurement results of the plurality of wheel sensors 28 and may be configured for controlling the pressing actuator 271. The widths of the (1-1)th wheel, the (1-2)th wheel, the (2-1)th wheel, and the (2-2)th wheel of the target vehicle may differ from one another depending on contact areas between the wheels and the roller portions 221b.

The lifting controller 29 may be configured to determine a (1-1)th correction value which is half of the difference between the input width of the (1-1)th wheel and the width of the (1-1)th wheel measured by the (1-1)th wheel sensor. The lifting controller 29 may perform (1-1)th width control to control the pressing actuator 271 so that the contact block of the (1-1)th lifting and lowering module 22a1 is moved toward the (1-1)th wheel by the determined (1-1)th correction value.

The lifting controller 29 may be configured to determine a (1-2)th correction value which is half of the difference between the input width of the (1-2)th wheel and the width of the (1-2)th wheel measured by the (1-2)th wheel sensor. The lifting controller 29 may perform (1-2)th width control to control the pressing actuator 271 so that the contact block of the (1-2)th lifting and lowering module 22a2 is moved toward the (1-2)th wheel by the determined (1-2)th correction value.

The lifting controller 29 may be configured to determine a (2-1)th correction value which is half of the difference between the input width of the (2-1)th wheel and the width of the (2-1)th wheel measured by the (2-1)th wheel sensor. The lifting controller 29 may perform (2-1)th width control to control the pressing actuator 271 so that the contact block of the (2-1)th lifting and lowering module 22b1 is moved toward the (2-1)th wheel by the determined (2-1)th correction value.

The lifting controller 29 may be configured to determine a (2-2)th correction value which is half of the difference between the input width of the (2-2)th wheel and the width of the (2-2)th wheel measured by the (2-2)th wheel sensor. The lifting controller 29 may perform (2-2)th width control to control the pressing actuator 271 so that the contact block of the (2-2)th lifting and lowering module 22b2 is moved toward the (2-2)th wheel by the determined (2-2)th correction value.

When the lifting controller 29 is configured to perform the (1-1)th width control, the (1-2)th width control, the (2-1)th width control, and the (2-2)th width control, the lateral center portion of the entry space S and the lateral center portion of the vehicle may be aligned with each other.

When a wheelbase of the vehicle which is to enter the entry space S is input, the lifting controller 29 may be configured for controlling the length actuator 272 so that the separation distance in the forward direction and the backward direction between the center portion of the first lifting and lowering module 22a and the center portion of the second lifting and lowering module 22b corresponds to the wheelbase. The wheelbase of the vehicle may mean the separation distance between the center portion of the front (F) side wheel and the center portion of the rear (B) side wheel of the vehicle.

The lifting controller 29 may stop the lift apparatus 20 based on a detection result of the scanner. For example, the lifting controller 29 may not stop the wheel lifter 25 when only the lifting and lowering module 22 is detected by the scanner. Furthermore, the lifting controller 29 may stop the wheel lifter 25 when an object is detected by the scanner in a state in which the lifting and lowering module 22 is located above the scanner.

The lifting controller 29 may operate the scanner only when the wheel lifter 25 operates. In other words, the lifting controller 29 may not operate the scanner in a state in which the wheel lifter 25 is stopped.

The lifting controller 29 may be implemented with a processor which is electrically connected to the wheel sensor 28, the pusher 22, and the wheel lifter 25 and is configured for decoding and executing a command based on previously input information.

The main controller may be configured for controlling the battery transfer apparatus 10 and the lift apparatus 20. Furthermore, the main controller is configured to receive signals from the position sensor 15 and the wheel sensor 28 and may transfer the received signals to the transfer controller 16 and the lifting controller 29. In other words, the main controller, the transfer controller 16, and the lifting controller 29 may be configured to perform at least one of wired communication or wireless communication with each other.

The main controller may be implemented with a processor which is electrically connected to the battery transfer apparatus 10 and the lift apparatus 20 and is configured for decoding and executing a command based on previously input information.

Hereinafter, an operating process of the battery swapping system 1 will be described.

The transfer controller 16 and the lifting controller 29 may transmit current states of the battery transfer apparatus 10 and the lift apparatus 20 to the main controller, respectively.

The main controller may identify the states of the battery transfer apparatus 10 and the lift apparatus 20.

A vehicle may approach the rear side of the entry space S.

A product detection sensor included in the battery swapping system 1 may obtain information related to the vehicle (e.g., information related to the type of the vehicle and information related to the license plate of the vehicle).

The main controller may search a database of vehicle subscribers and may identify the specifications of the vehicle (a wheelbase distance, a QR code for stopping an AGV).

The QR code for stopping the AGV may be input to the transfer controller 16.

The main controller may transfer a signal to the lifting controller 29 so that the plurality of lifting and lowering modules 22 are placed in an initial state.

The lifting controller 29 may be configured for controlling the wheel lifter 25 so that all of the lifting and lowering modules 22 are placed in the initial state. The lifting controller 29 may transfer, to the main controller, a signal indicating that all of the lifting and lowering modules 22 are placed in the initial state.

The main controller may allow the vehicle to enter the entry space S.

Four wheels included in the vehicle may be accommodated on the plurality of lifting and lowering modules 22, respectively.

The main controller may transfer, to the lifting controller 29, a pusher driving signal to drive the plurality of pushers 222, based on the input information of the vehicle.

The lifting controller 29 may drive the plurality of pushers 222, based on detection results of the plurality of wheel sensors 28 and may transfer a driving result to the main controller.

When the plurality of pushers 222 are driven without an error depending on the pusher driving signal transferred to the lifting controller 29, the main controller may transfer a signal to the lifting controller 29 to prepare a lift of the plurality of lifting and lowering modules 22.

The lifting controller 29 may transfer a preparation completion signal to the main controller when the lift of the plurality of lifting and lowering modules 22 is prepared.

The main controller may transfer a signal to the lifting controller 29 to raise the plurality of lifting and lowering modules 22 based on a target lifting speed and a target lifting height.

The lifting controller 29 may be configured for controlling the wheel lifter 25 so that the plurality of lifting and lowering modules 22 are raised to the target lifting height at the target lifting speed.

The main controller may transfer a signal to the transfer controller 16 to allow the battery transfer apparatus 10 to enter to a position not interfering with the lift apparatus 20.

The lifting controller 29 may transfer the current heights of the plurality of lifting and lowering modules 22 to the main controller. For example, the lifting controller 29 may transfer the current heights of the plurality of lifting and lowering modules 22 to the main controller every first repetition time (e.g., 1 second) which is a preset time period.

The main controller may identify a difference in height between the highest lifting and lowering module and the lowest lifting and lowering module among the plurality of lifting and lowering modules 22 every repetition time. The main controller may stop the lift apparatus 20 when the height difference is greater than a height error value (e.g., 20 mm) and may not stop the lift apparatus 20 when the height difference is smaller than the height error value.

The lifting controller 29 may stop all of the plurality of lifting and lowering modules 22 when the plurality of lifting and lowering modules 22 arrive at the target lifting height.

When the main controller is configured to determine that the height difference between the highest lifting and lowering module and the lowest lifting and lowering module among the plurality of lifting and lowering modules 22 is smaller than a height deviation value (e.g., 10 mm), an operator may perform a first task of separating a battery cover provided in the vehicle.

The lifting controller 29 may transfer, to the main controller, a signal indicating that the first task is completed.

The main controller may transfer a signal to the transfer controller 16 to move the unmanned transport vehicle 13 forward so that the unmanned transport vehicle 13 enters a place below the lifted vehicle.

After the unmanned transport vehicle 13 enters the place below the lifted vehicle, the transfer controller 16 may stop the unmanned transport vehicle 13 when the input QR code for stopping the AGV matches a QR code of the vehicle.

The transfer controller 16 may raise the seating portion 11 toward the battery receiving space. An operator may perform a second task of separating a battery provided in the vehicle.

The transfer controller 16 may transfer, to the main controller, a signal indicating that the second task is completed.

The transfer controller 16 may lower the seating portion 11.

The lifting controller 29 may transfer the current heights of the plurality of lifting and lowering modules 22 to the main controller.

The main controller may be configured to determine whether the current heights of the plurality of lifting and lowering modules 22 correspond to a position interfering with the battery transfer apparatus 10. When it is determined that the current heights of the plurality of lifting and lowering modules 22 correspond to a position not interfering with the battery transfer apparatus 10, the main controller may transfer a signal to the transfer controller 16 to move the unmanned transport vehicle 13 backward thereof.

The transfer controller 16 may move the unmanned transport vehicle 13 backward thereof. The discharged battery may be transferred to the unloading position, and a charged battery may be accommodated in the seating space 11a.

The lifting controller 29 may transfer the heights of the plurality of lifting and lowering modules 22 to the main controller.

The main controller may be configured to determine whether the current heights of the plurality of lifting and lowering modules 22 correspond to a position interfering with the battery transfer apparatus 10. When it is determined that the current heights of the plurality of lifting and lowering modules 22 correspond to a position not interfering with the battery transfer apparatus 10, the main controller may transfer a signal to the transfer controller 16 to move the unmanned transport vehicle 13 forward so that the unmanned transport vehicle 13 enters the place below the lifted vehicle.

After the unmanned transport vehicle 13 enters the place below the lifted vehicle, the transfer controller 16 may stop the unmanned transport vehicle 13 when the input QR code for stopping the AGV matches the QR code of the vehicle.

The transfer controller 16 may raise the seating portion 11 toward the battery receiving space. An operator may perform a third task of mounting the charged battery in the vehicle.

The transfer controller 16 may transfer, to the main controller, a signal indicating that the third task is completed.

The transfer controller 16 may lower the seating portion 11.

The lifting controller 29 may transfer the current heights of the plurality of lifting and lowering modules 22 to the main controller.

The main controller may be configured to determine whether the current heights of the plurality of lifting and lowering modules 22 correspond to a position interfering with the battery transfer apparatus 10. When it is determined that the current heights of the plurality of lifting and lowering modules 22 correspond to a position not interfering with the battery transfer apparatus 10, the main controller may transfer a signal to the transfer controller 16 to move the unmanned transport vehicle 13 backward thereof.

The transfer controller 16 may move the unmanned transport vehicle 13 backward thereof. At the instant time, the control of the transfer controller 16 may end portion.

An operator may perform a fourth task of fastening the battery cover to the vehicle.

The lifting controller 29 may transfer, to the main controller, a signal indicating that the fourth task is completed.

The main controller may be configured to determine whether the tasks of all the operators are completed, and when it is determined that the tasks of all the operators are completed, the main controller may transfer a signal to the lifting controller 29 to prepare downward movement of the plurality of lifting and lowering modules 22.

When the preparation for the downward movement of the plurality of lifting and lowering modules 22 is completed, the lifting controller 29 may transfer, to the main controller, a signal indicating that the preparation for the downward movement is completed.

The main controller may transfer a signal to the lifting controller 29 to lower the plurality of lifting and lowering modules 22 based on a target lowering speed and a target lowering height.

The lifting controller 29 may be configured for controlling the wheel lifter 25 so that the plurality of lifting and lowering modules 22 are lowered to the target lowering height at the target lowering speed.

The lifting controller 29 may transfer the current heights of the plurality of lifting and lowering modules 22 to the main controller. For example, the lifting controller 29 may transfer the current heights of the plurality of lifting and lowering modules 22 to the main controller every second repetition time (e.g., 1 second) which is a preset time period.

The main controller may identify a difference in height between the highest lifting and lowering module and the lowest lifting and lowering module among the plurality of lifting and lowering modules 22 every repetition time. The main controller may stop the lift apparatus 20 when the height difference is greater than the height error value (e.g., 20 mm) and may not stop the lift apparatus 20 when the height difference is smaller than the height error value.

The lifting controller 29 may stop all of the plurality of lifting and lowering modules 22 when the plurality of lifting and lowering modules 22 arrive at the target lowering height (e.g., when the lifting and lowering modules 22 are at the lowest position).

When the main controller is configured to determine that the height difference between the highest lifting and lowering module and the lowest lifting and lowering module among the plurality of lifting and lowering modules 22 is smaller than the height deviation value (e.g., 10 mm), the vehicle located in the entry space S may be allowed to leave.

The lift apparatus according to an exemplary embodiment of the present disclosure may prevent damage to the battery and the vehicle during the battery swapping by aligning the wheels of the vehicle with respect to the lift apparatus by pressing the wheels of the vehicle placed in the misaligned state.

Hereinabove, even though all of the components are coupled into one body or operate in a combined state in the description of the above-mentioned embodiments of the present disclosure, the present disclosure is not limited to these embodiments. That is, all of the components may operate in one or more selective combination within the range of the purpose of the present disclosure. It should be also understood that the terms of "include", "comprise" or "have" in the specification are "open type" expressions just to say that the corresponding components exist, and unless described to the contrary, do not exclude but may include additional components. Unless otherwise defined, all terms used herein, including technical and scientific terms, include the same meaning as those generally understood by those skilled in the art to which the present disclosure pertains. Such terms as those defined in a generally used dictionary are to be interpreted as including meanings equal to the contextual meanings in the relevant field of art, and are not to be interpreted as including ideal or excessively formal meanings unless clearly defined as including such in the present application.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A lift apparatus for a vehicle, the lift apparatus comprising:
   a frame configured to provide an entry space that the vehicle required to be lifted enters;
   a lifting and lowering module configured to raise and lower the vehicle in the entry space relative to the frame;
   a wheel sensor configured for measuring a width of a wheel of a target vehicle to be lifted, the wheel of the target vehicle being supported on a wheel support portion;
   a pressing actuator configured to drive a pusher; and
   a lifting controller configured to compare an input width of the wheel of the target vehicle and a measurement result of the wheel sensor and control the pressing actuator,
   wherein the lifting and lowering module includes:
      the wheel support portion configured to support a wheel of the vehicle; and
      the pusher configured to press the wheel of the vehicle supported on the wheel support portion so that a lateral center portion of the entry space and a lateral center portion of the vehicle are aligned with each other.

2. The lift apparatus of claim 1, wherein the wheel support portion includes a roller portion including a roller configured to rotate about a roller rotation axis configured to extend in a direction perpendicular to a width direction of the entry space so that the wheel of the vehicle is moved in the width direction of the entry space in response that the pusher presses the wheel of the vehicle.

3. The lift apparatus of claim 2, wherein the roller portion, viewed in the width direction of the entry space, includes a shape in which a width thereof in a forward and backward direction is decreased downward.

4. The lift apparatus of claim 3, wherein the roller portion includes:
   a first rolling region including a first roller configured to form a front side of the roller portion; and
   a second rolling region including a second roller configured to form a rear side of the roller portion,
   wherein the first rolling region obliquely extends in the forward and backward direction so that a front end portion thereof is disposed above a rear end portion thereof, and wherein the second rolling region obliquely extends in the forward and backward direction so that a rear end portion thereof is disposed above a front end portion thereof.

5. The lift apparatus of claim 1, wherein the lifting and lowering module includes:

a first lifting and lowering module, a position of which is fixed relative to the frame in a forward and backward direction thereof; and a second lifting and lowering module configured to move relative to the frame in the forward and backward direction.

6. The lift apparatus of claim 5, further including:

a length actuator configured to move the second lifting and lowering module in the forward and backward direction; and a lifting controller configured to control the length actuator so that a separation distance in the forward and backward direction between a center portion of the first lifting and lowering module and a center portion of the second lifting and lowering module corresponds to an input wheelbase, in response that the wheelbase of the vehicle scheduled to enter the entry space is input.

7. The lift apparatus of claim 5, wherein the wheel of the vehicle includes a front side wheel and a rear side wheel, wherein the first lifting and lowering module raises and lowers one of the front side wheel and the rear side wheel of the vehicle, and wherein the second lifting and lowering module raises and lowers another one of the front side wheel and the rear side wheel of the vehicle.

8. The lift apparatus of claim 5, wherein the pusher includes a first pusher and a second pusher, and wherein the first pusher of the first lifting and lowering module and the second pusher of the second lifting and lowering module independently perform pressing operations.

9. The lift apparatus of claim 8, wherein the wheel of the vehicle is in plural, and wherein the first lifting and lowering module includes a first roller portion configured to guide movement of a wheel of the vehicle pressed by the first pusher in a width direction of the entry space among the plurality of the wheels, wherein the second lifting and lowering module includes a second roller portion configured to guide movement of a wheel of the vehicle pressed by the second pusher in the width direction of the entry space among the plurality of the wheels, and wherein a first length by which the first roller portion extends in the width direction of the entry space is shorter than a second length by which the second roller portion extends in the width direction of the entry space.

10. The lift apparatus of claim 9, wherein a direction in which the pusher presses the wheel of the vehicle is defined as a pressing direction, and a direction opposite to the pressing direction is defined as an opposite pressing direction, wherein based on the width direction of the entry space, an end portion of the first roller portion in the pressing direction is disposed in the opposite pressing direction, compared to an end portion of the second roller portion in the pressing direction, and wherein based on the width direction of the entry space, an end portion of the first roller portion in the opposite pressing direction corresponds to an end portion of the second roller portion in the opposite pressing direction.

11. The lift apparatus of claim 5, further including:

a lifting and lowering frame connected to the frame to be raised and lowered; and a length guide disposed between the lifting and lowering frame and the second lifting and lowering module to guide movement of the second lifting and lowering module relative to the lifting and lowering frame in the forward and backward direction.

12. The lift apparatus of claim 1, wherein the pusher includes a contact block, at least a portion of which is brought into contact with the wheel of the vehicle in response that the pusher presses the wheel of the vehicle, and wherein the contact block extends in a forward and backward direction perpendicular to a width direction of the entry space.

13. The lift apparatus of claim 1, wherein the frame includes:

a front frame configured to form a front side of the entry space, the front frame including a first front frame and a second front frame spaced from each other in a width direction of the entry space; and a rear frame configured to form a rear side of the entry space, the rear frame including a first rear frame and a second rear frame spaced from each other in the width direction of the entry space, and wherein the lifting and lowering module is in plural and the plurality of lifting and lowering modules is configured to be raised and lowered relative to the first front frame, the second front frame, the first rear frame, and the second rear frame, respectively.

14. The lift apparatus of claim 1, further including:

a wheel lifter configured to raise and lower the lifting and lowering module relative to the frame, wherein the wheel lifter includes a wheel lifting chain, one end portion of which is connected to the lifting and lowering module, and wherein the wheel lifting chain, viewed in a direction perpendicular to an up and down direction, includes a shape convex downward so that the one end portion and an opposite end portion of the wheel lifting chain are directed upwards.

15. The lift apparatus of claim 14, wherein the wheel lifting chain is singly provided, and wherein the wheel lifter further includes a single wheel lifting sprocket configured to raise and lower the one end portion of the wheel lifting chain by rotating in a state of being engaged with a portion of the wheel lifting chain.

16. The lift apparatus of claim 1, wherein the lifting and lowering module includes:

a (1-1)th lifting and lowering module configured to raise and lower a (1-1)th wheel provided on one side of the target vehicle in a width direction thereof; and a (1-2)th lifting and lowering module configured to raise and lower a (1-2)th wheel provided on an opposite side of the target vehicle in the width direction, the (1-2)th wheel being configured to face the (1-1)th wheel in the width direction, and wherein the lifting controller:

is configured to determine a (1-1)th correction value corresponding to half of a difference between an input width of the (1-1)th wheel and a width of the (1-1)th wheel measured by the wheel sensor and a (1-2)th correction value corresponding to half of a difference between an input width of the (1-2)th wheel and a width of the (1-2)th wheel measured by the wheel sensor;

is configured to control the pressing actuator so that an end portion of a pusher of the (1-1)th lifting and lowering module is moved toward the (1-1)th wheel by the (1-1)th correction value to press the (1-1)th wheel and an end portion of a pusher of the (1-2)th lifting and lowering module is moved toward the (1-2)th wheel by the (1-2)th correction value to press the (1-2)th wheel; and is configured to align the lateral center portion of the entry space and the lateral center portion of the vehicle with each other.

\* \* \* \* \*